United States Patent
Ma et al.

(10) Patent No.: US 12,016,044 B2
(45) Date of Patent: Jun. 18, 2024

(54) DATA TRANSMISSION METHOD AND COMMUNICATIONS APPARATUS

(71) Applicant: Huawei Technologies Co., Ltd., Shenzhen (CN)

(72) Inventors: Ruixiang Ma, Beijing (CN); Lei Guan, Beijing (CN); Yuan Li, Bonn (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 398 days.

(21) Appl. No.: 17/313,903

(22) Filed: May 6, 2021

(65) Prior Publication Data

US 2021/0266912 A1    Aug. 26, 2021

Related U.S. Application Data

(63) Continuation of application No. PCT/CN2019/116781, filed on Nov. 8, 2019.

(30) Foreign Application Priority Data

Nov. 9, 2018  (CN) .......................... 201811333734.6
Jan. 11, 2019 (CN) .......................... 201910028765.9

(51) Int. Cl.
  *H04W 72/53*  (2023.01)
  *H04W 72/0446* (2023.01)
  *H04W 72/1263* (2023.01)
  *H04W 72/21* (2023.01)

(52) U.S. Cl.
  CPC ....... *H04W 72/53* (2023.01); *H04W 72/0446* (2013.01); *H04W 72/1263* (2013.01); *H04W 72/21* (2023.01)

(58) Field of Classification Search
  CPC . H04L 1/08; H04L 1/187; H04L 1/189; H04L 1/1896; H04L 5/0078; H04W 72/0446; H04W 72/1263; H04W 72/21; H04W 72/53
  See application file for complete search history.

(56) References Cited

U.S. PATENT DOCUMENTS

| 9,226,307 B1 | 12/2015 | Dinan |
| 2017/0288827 A1 | 10/2017 | Bayesteh et al. |
| 2020/0015222 A1* | 1/2020 | Huang ................. H04W 72/04 |
| 2020/0022125 A1 | 1/2020 | Li et al. |

(Continued)

FOREIGN PATENT DOCUMENTS

| CN | 107438240 A | 12/2017 |
| CN | 107872302 A | 4/2018 |

(Continued)

OTHER PUBLICATIONS

US 10,787,230, 4/2021 (withdrawn).

(Continued)

*Primary Examiner* — Shah M Rahman
(74) *Attorney, Agent, or Firm* — Slater Matsil, LLP

(57) ABSTRACT

This application provides a data transmission method and a communications apparatus. The method includes: first determining, based on a first time domain resource, M mini-slot-level second time domain resources that do not cross a slot boundary; and then performing repeated mini-slot-level data transmission on the M second time domain resources.

20 Claims, 23 Drawing Sheets

(56) References Cited

U.S. PATENT DOCUMENTS

| | | | |
|---|---|---|---|
| 2020/0052827 A1* | 2/2020 | Vilaipornsawai | H04L 5/0044 |
| 2020/0100223 A1* | 3/2020 | Park | H04W 72/23 |
| 2020/0213984 A1* | 7/2020 | Hwang | H04W 72/0453 |
| 2020/0275431 A1* | 8/2020 | Bae | H04W 72/04 |
| 2021/0045110 A1* | 2/2021 | Fröberg Olsson | H04W 72/0446 |
| 2021/0058922 A1* | 2/2021 | Han | H04L 5/0055 |
| 2021/0250142 A1* | 8/2021 | Wang | H04L 5/0053 |
| 2021/0250966 A1* | 8/2021 | Li | H04W 72/20 |
| 2021/0282137 A1* | 9/2021 | Wang | H04W 72/23 |
| 2021/0307051 A1* | 9/2021 | Chatterjee | H04W 72/1273 |
| 2021/0314982 A1* | 10/2021 | Panteleev | H04L 5/0053 |
| 2021/0392648 A1* | 12/2021 | Andersson | H04L 5/0044 |
| 2022/0030607 A1* | 1/2022 | Liu | H04L 27/2602 |
| 2022/0039136 A1* | 2/2022 | Takeda | H04L 1/08 |
| 2022/0061067 A1* | 2/2022 | Andersson | H04W 72/23 |

FOREIGN PATENT DOCUMENTS

| | | |
|---|---|---|
| CN | 108282274 A | 7/2018 |
| CN | 108631834 A | 10/2018 |
| EP | 3282618 A1 | 2/2018 |
| WO | 2018036560 A1 | 3/2018 |
| WO | 2018145093 A1 | 8/2018 |
| WO | 2018175596 A1 | 9/2018 |
| WO | 2018177259 A1 | 10/2018 |

OTHER PUBLICATIONS

Nokia et al., "On scheduled PUSCH (and POSCH) repetition enhancements for NR URLLC", 3GPP TSG RAN WG1 Meeting #95, R1-1813115, Nov. 12-16, 2018, 4 pages, Spokane, US.

3GPP TS 38.101-1 V15.3.0, 3rd Generation Partnership Project, Technical Specification Group Radio Access Network, NR, User Equipment (UE) radio transmission and reception, Part 1, Range 1 Standalone (Release 15), Sep. 2018, 219 pages.

CATT, "Discussion on potential enhancements to PUSCH", 3GPP TSG RAN WG1 Meeting #95, R1-1812630, Nov. 12-16, 2018, 3 pages, Spokane, USA.

3GPP TS 38.104 V15.3.0, 3rd Generation Partnership Project, Technical Specification Group Radio Access Network, NR, Base Station (BS) radio transmission and reception (Release 15), Sep. 2018, 151 pages.

3GPP TS 38.211 V15.3.0, 3rd Generation Partnership Project, Technical Specification Group Radio Access Network, NR, Physical channels and modulation (Release 15), Sep. 2018, 96 pages.

3GPP TS 38.212 V15.3.0, 3rd Generation Partnership Project, Technical Specification Group Radio Access Network, NR, Multiplexing and channel coding (Release 15), Sep. 2018, 99 pages.

3GPP TS 38.213 V15.3.0, 3rd Generation Partnership Project, Technical Specification Group Radio Access Network, NR, Physical layer procedures for control (Release 15), Sep. 2018, 101 pages.

3GPP TS 38.214 V15.3.0, 3rd Generation Partnership Project, Technical Specification Group Radio Access Network, NR, Physical layer procedures for data (Release 15), Sep. 2018, 96 pages.

3GPP TS 38.215 V15.3.0, 3rd Generation Partnership Project, Technical Specification Group Radio Access Network, NR, Physical layer measurements (Release 15), Sep. 2018, 15 pages.

3GPP TS 38.300 V15.3.1, 3rd Generation Partnership Project, Technical Specification Group Radio Access Network, NR, NR and NG-RAN Overall Description, Stage 2 (Release 15), Oct. 2018, 92 pages.

3GPP TS 38.321 V15.3.0, 3rd Generation Partnership Project, Technical Specification Group Radio Access Network, NR, Medium Access Control (MAC) protocol specification (Release 15), Sep. 2018, 76 pages.

3GPP TS 38.331 V15.3.0, 3rd Generation Partnership Project, Technical Specification Group Radio Access Network, NR, Radio Resource Control (RRC) protocol specification (Release 15), Sep. 2018, 445 pages.

Huawei et al., "L1 enhancements for URLLC", 3GPP TSG RAN WG1 Meeting #94bis, R1-1810157, China, Oct. 8-12, 2018, 15 pages.

Ericsson, "Enhancements to Uplink and Downlink Physical Channels for NR URLLC", 3GPP TSG-RAN WG1 Meeting #94bis, R1-1810174, Oct. 8-12, 2018, 12 pages, Chengdu, China.

LG Electronics, "Discussion on layer 1 enhancements for URLLC", 3GPP TSG RAN WG1 Meeting #94bis, R1-1810294, Oct. 8-12, 2018, 11 pages, Chengdu, China,.

ZTE, "On URLLC Layer 1 enhancements", 3GPP TSG RAN WG1 Meeting #94bis, R1-1810345, Oct. 8-12, 2018, 8 pages, Chengdu, China.

Vivo, "Layer 1 enhancements for URLLC", 3GPP TSG RAN WG1 Meeting #94bis, R1-1810395, Oct. 8-12, 2018, 12 pages, Chengdu, China.

"PUSCH enhancements for URLLC," Agenda Item: 7.2.6.3, Source: Huawei, HiSilicon, SIA, Document for: Discussion and Decision, 3GPP TSG RAN WG1 Meeting #98bis, R1-1910068, Chongqing, China, Oct. 14-20, 2019, 13 pages.

"PUSCH Enhancements for NR URLLC," Agenda Item: 7.2.6.1.2, Source: Ericsson, Document for: Discussion, Decision, 3GPP TSG-RAN WG1 Meeting #95, R1-1812155, Spokane, USA, Nov. 12-16, 2018, 7 pages.

"On Enhancements to Configured UL Grant Operation," Source: CATT, Agenda Item: 7.2.6.3, Document for: Discussion and Decision, 3GPP TSG RAN WG1 Meeting #95, R1-1812633, Spokane, USA, Nov. 12-16, 2018, 5 pages.

* cited by examiner the fourth time domain resource to the $1^{st}$ slot boundary in the H slot

DATA TRANSMISSION METHOD AND COMMUNICATIONS APPARATUS

CROSS-REFERENCE TO RELATED APPLICATIONS

This application is a continuation of International Application No. PCT/CN2019/116781, filed on Nov. 8, 2019, which claims priority to Chinese Patent Application No. 201811333734.6, filed on Nov. 9, 2018 and Chinese Patent Application No. 201910028765.9, filed on Jan. 11, 2019. All of the aforementioned patent applications are hereby incorporated by reference in their entireties.

TECHNICAL FIELD

This application relates to the communications field, and more specifically, to a data transmission method and a communications apparatus.

BACKGROUND

A fifth generation (5G) mobile communications system is dedicated to supporting higher system performance, a plurality of service types, different deployment scenarios, and a wider spectrum range. The plurality of service types include an enhanced mobile broadband (eMBB) service, a massive machine type communication (mMTC) service, an ultra-reliable and low-latency communications (URLLC) service, a multimedia broadcast multicast service (MBMS), a positioning service, and the like.

There are a plurality of types of URLLC services. Typical examples include industrial control, industrial production process automation, man-machine interaction, telemedicine, and the like. Specific requirements of the URLLC service include: 99.999% of data transmission reliability, transmission latency less than 1 ms, and signaling overheads reduced as much as possible while requirements for high reliability and low latency are met. Ensuring reliability and latency of the URLLC service becomes a problem of great concern in this field. To ensure data transmission reliability of the URLLC service, currently, repeated data transmission based on a slot is proposed to improve data transmission reliability and reduce latency of the URLLC service. However, the requirement of the URLLC service still cannot be met.

SUMMARY

This application provides a data transmission method and an apparatus, so that data can be repeatedly sent on a plurality of mini-slot-level time domain resources, thereby further reducing data transmission latency while improving data transmission reliability.

According to a first aspect, a data transmission method is provided. The transmission method may be performed by a terminal device or a chip applied to a terminal device. For example, the transmission method is performed by the terminal device. The method includes: determining, by a terminal device, a first time domain resource; determining, by the terminal device, M second time domain resources based on the first time domain resource, where M is an integer greater than 1; and sending, by the terminal device, first data to a network device for M times on the M second time domain resources; or receiving, on the M second time domain resources, second data sent by a network device for M times.

According to the data transmission method provided in the first aspect, because data is repeatedly transmitted on the M second time domain resources, and the M second time domain resources are determined based on the first time domain resource, the M second time domain resources each may have a mini-slot-level length. In this way, data is repeatedly sent, data transmission latency is reduced, and data transmission reliability is improved.

In a possible implementation of the first aspect, the determining, by the terminal device, M second time domain resources based on the first time domain resource includes: determining, by the terminal device, R third time domain resources based on the first time domain resource, where R is an integer greater than 1; and determining, by the terminal device, the M second time domain resources based on whether the R third time domain resources cross a slot boundary. According to the transmission method, it can be ensured that none of the M second time domain resources crosses a slot boundary, thereby ensuring reliability of data transmission on the M second time domain resources while reducing data transmission latency, and improving data transmission efficiency.

In a possible implementation of the first aspect, the determining, by the terminal device, the M second time domain resources based on whether the R third time domain resources cross a slot boundary includes: if none of the R third time domain resources crosses a slot boundary, determining the R third time domain resources as the M second time domain resources, where M is equal to R.

In a possible implementation of the first aspect, the determining, by the terminal device, the M second time domain resources based on whether the R third time domain resources cross a slot boundary includes: dividing, by the terminal device based on a slot boundary, a time domain resource that is in the R third time domain resources and that crosses a slot boundary; and determining, by the terminal device, the M second time domain resources based on a time domain resource that is in the R third time domain resources and that does not cross a slot boundary and the time domain resource that is divided based on the slot boundary.

In a possible implementation of the first aspect, the determining, by the terminal device, the M second time domain resources based on whether the R third time domain resources cross a slot boundary includes: dividing, by the terminal device based on a slot boundary, a time domain resource that is in the R third time domain resources and that crosses a slot boundary; and determining, by the terminal device, the M second time domain resources based on a time domain resource that is in the R third time domain resources and that does not cross a slot boundary and the time domain resource that is divided based on the slot boundary, where M is equal to R.

In a possible implementation of the first aspect, the dividing, by the terminal device based on a slot boundary, a time domain resource that is in the R third time domain resources and that crosses a slot boundary includes: dividing, by the terminal device, a fourth time domain resource that is in the R third time domain resources and that crosses a slot boundary into H+1 second time domain resources, where the fourth time domain resource is any one of the R third time domain resources that crosses a slot boundary, the fourth time domain resource crosses H slot boundaries, and H is a positive integer.

In a possible implementation of the first aspect, the H+1 second time domain resources include: one second time domain resource from a start symbol of the fourth time domain resource to the $1^{st}$ slot boundary in the H slot boundaries, H−1 second time domain resources that are H−1 slots in the middle, and one second time domain resource from the last slot boundary in the H slot boundaries to an end symbol of the fourth time domain resource.

In a possible implementation of the first aspect, the M second time domain resources include Q third time domain resources and a second time domain resource that is determined based on a fourth time domain resource, and the Q third time domain resources are time domain resources that are in the R third time domain resources and that do not cross a slot boundary; and the fourth time domain resource is any one of the R third time domain resources that crosses a slot boundary, the fourth time domain resource crosses H slot boundaries, and H+1 second time domain resources determined based on the fourth time domain resource include: one second time domain resource from a start symbol of the fourth time domain resource to the $1^{st}$ slot boundary in the H slot boundaries, H−1 second time domain resources that are H−1 slots in the middle, and one second time domain resource from the last slot boundary in the H slot boundaries to an end symbol of the fourth time domain resource.

In a possible implementation of the first aspect, R is greater than M.

In a possible implementation of the first aspect, the dividing, by the terminal device based on a slot boundary, a time domain resource that is in the R third time domain resources and that crosses a slot boundary includes: dividing, by the terminal device, a fourth time domain resource that is in the R third time domain resources and that crosses a slot boundary into H+1 fifth time domain resources, where the fourth time domain resource is any one of the R third time domain resources that crosses a slot boundary, the fourth time domain resource crosses H slot boundaries, and H is a positive integer; combining, by the terminal device, the $1^{st}$ fifth time domain resource in the H+1 fifth time domain resources with the third time domain resource before the fourth time domain resource to form one second time domain resource; and combining the last fifth time domain resource in the H+1 fifth time domain resources with the third time domain resource after the fourth time domain resource to form one second time domain resource.

In a possible implementation of the first aspect, R is less than M.

In a possible implementation of the first aspect, the determining, by the terminal device, R third time domain resources based on the first time domain resource includes: repeating, by the terminal device, the first time domain resource for R times based on a quantity R of repetitions and intervals between the R third time domain resources, to obtain the R third time domain resources.

In a possible implementation of the first aspect, the method further includes: receiving, by the terminal device, seventh indication information from the network device, where the seventh indication information is used to indicate the intervals between the R third time domain resources.

In a possible implementation of the first aspect, the intervals between the R third time domain resources are o, or the R third time domain resources are consecutive in time domain.

In a possible implementation of the first aspect, the determining, by the terminal device, R third time domain resources based on the first time domain resource includes: dividing, by the terminal device, the first time domain resource into the R third time domain resources.

In a possible implementation of the first aspect, the dividing, by the terminal device, the first time domain resource into the R third time domain resources includes: dividing, by the terminal device, the first time domain resource into the R third time domain resources based on a quantity R of repetitions, where each of R−1 third time domain resources in the R third time domain resources has $\lfloor L/R \rfloor$ consecutive symbols, L is a quantity of consecutive symbols of the first time domain resource, and L is a positive integer.

In a possible implementation of the first aspect, the dividing the first time domain resource into the R third time domain resources includes: dividing the first time domain resource into the R third time domain resources based on a quantity of symbols of the first time domain resource before the $1^{st}$ slot boundary, where the first time domain resource crosses X slot boundaries, the quantity of symbols of the first time domain resource before the $1^{st}$ slot boundary is T, and a quantity of symbols of the last third time domain resource in the R third time domain resources is less than or equal to T.

In a possible implementation of the first aspect, the dividing the first time domain resource into the R third time domain resources includes: dividing the first time domain resource into X+1 time domain resources based on a slot boundary, where the first time domain resource crosses X slot boundaries, and a quantity of symbols of the first time domain resource before the $1^{st}$ slot boundary is T; dividing each of the X+1 time domain resources based on a length of T symbols; and if any one of the X+1 time domain resources has K symbols remained and K<T, using the K symbols as one third time domain resource, or adding the K symbols to a previous third time domain resource.

In a possible implementation of the first aspect, the dividing the first time domain resource into the R third time domain resources includes: dividing the first time domain resource into the R third time domain resources based on a quantity of symbols of the first time domain resource after the last slot boundary, where the first time domain resource crosses X slot boundaries, the quantity of symbols of the first time domain resource after the last slot boundary is Y, and a quantity of symbols of the last third time domain resource in the R third time domain resources is less than or equal to Y.

In a possible implementation of the first aspect, the dividing the first time domain resource into the R third time domain resources includes: dividing the first time domain resource into X+1 time domain resources based on a slot boundary, where the first time domain resource crosses X slot boundaries, and a quantity of symbols of the first time domain resource after the last slot boundary is Y; dividing each of the X+1 time domain resources based on a length of Y symbols; and if any one of the X+1 time domain resources has K symbols remained and K<Y, using the K symbols as one third time domain resource, or adding the K symbols to a previous third time domain resource.

In a possible implementation of the first aspect, the dividing, by the terminal device, the first time domain resource into the R third time domain resources includes: receiving first indication information from the network device, where the first indication information is used to indicate a first division manner for the first time domain resource; and dividing the first time domain resource into the R third time domain resources in the first division manner, where the first time domain resource corresponds to a plurality of division manners, and the first division manner is one of the plurality of division manners. In this division manner, because the quantity R of repetitions does not need to be obtained, signaling overheads can be reduced.

In a possible implementation of the first aspect, the method further includes: receiving second indication information from the network device, where the second indication information is used to indicate a value of the quantity R of repetitions.

In a possible implementation of the first aspect, the determining, by a terminal device, a first time domain resource includes: receiving third indication information from the network device, where the third indication information is used to indicate a start and length indicator value SLIV of the first time domain resource, and the SLIV, a start symbol S, and a length L satisfy the following mapping relationship:

if $(L-1) \leq \lfloor N/2 \rfloor$, SLIV=$N^*(L-1)+S$;

otherwise, SLIV=$N^*(N-L+1)+(N-1-S)$ where $0<L(N-S)$.

$N>14$; and

S is a number of a start symbol of the first time domain resource, S is an integer greater than or equal to o, L is the quantity of consecutive symbols of the first time domain resource, and L and N are positive integers.

In a possible implementation of the first aspect, the determining, by a terminal device, a first time domain resource includes: receiving, by the terminal device, third indication information from the network device, where the third indication information is used to indicate one row in a time domain resource table, one row in the time domain resource table includes a number S of a start symbol and the quantity L of consecutive symbols of the first time domain resource, S is an integer greater than or equal to o, and L is a positive integer; and determining, by the terminal device, a time domain position of the first time domain resource based on S and L. Optionally, the time domain resource table is configured by higher layer signaling.

In a possible implementation of the first aspect, the determining a first time domain resource includes: receiving fourth indication information from the network device, where the fourth indication information is used to indicate the quantity X of slot boundaries crossed by the first time domain resource, and X is a nonnegative integer; and receiving fifth indication information from the network device, where the fifth indication information is used to indicate the number S of the start symbol and the reference length L of the first time domain resource, where the number of the start symbol of the first time domain resource is S, and the length of the first time domain resource is L+(X—1)*14 symbols.

In a possible implementation of the first aspect, the determining a first time domain resource includes: receiving sixth indication information from the network device, where the sixth indication information is used to indicate a quantity W of slots crossed by the first time domain resource, and W is a nonnegative integer; and receiving fifth indication information from the network device, where the fifth indication information is used to indicate the number S of the start symbol and the reference length L of the first time domain resource, where the number of the start symbol of the first time domain resource is S, and the length of the first time domain resource is L+W*14 symbols.

According to a second aspect, a data transmission method is provided. The transmission method may be performed by a network device or a chip applied to a network device. For example, the transmission method is performed by the network device. The method includes: determining, by a network device, a first time domain resource; determining, by the network device, M second time domain resources based on the first time domain resource, where M is an integer greater than 1; and sending, by the network device, second data to a terminal device for M times on the M second time domain resources, or receiving, by the network device on the M second time domain resources, first data sent by the terminal device for M times.

According to the data transmission method provided in the second aspect, because data is repeatedly transmitted on the M second time domain resources, and the M second time domain resources are determined based on the first time domain resource, the M second time domain resources each may have a mini-slot-level length. In this way, data is repeatedly sent, data transmission latency is reduced, and data transmission reliability is improved.

In a possible implementation of the second aspect, the determining, by the network device, M second time domain resources based on the first time domain resource includes: determining, by the network device, R third time domain resources based on the first time domain resource, where R is an integer greater than 1; and determining, by the network device, the M second time domain resources based on whether the R third time domain resources cross a slot boundary. According to the transmission method, it can be ensured that none of the M second time domain resources crosses a slot boundary, thereby ensuring reliability of data transmission on the M second time domain resources while reducing data transmission latency, and improving data transmission efficiency.

In a possible implementation of the second aspect, the determining, by the network device, the M second time domain resources based on whether the R third time domain resources cross a slot boundary includes: if none of the R third time domain resources crosses a slot boundary, determining the R third time domain resources as the M second time domain resources, where M is equal to R.

In a possible implementation of the second aspect, the determining, by the network device, the M second time domain resources based on whether the R third time domain resources cross a slot boundary includes: dividing, by the network device based on a slot boundary, a time domain resource that is in the R third time domain resources and that crosses a slot boundary; and determining, by the network device, the M second time domain resources based on a time domain resource that is in the R third time domain resources and that does not cross a slot boundary and the time domain resource that is divided based on the slot boundary.

In a possible implementation of the second aspect, M is equal to R.

In a possible implementation of the second aspect, the dividing, by the network device based on a slot boundary, a time domain resource that is in the R third time domain resources and that crosses a slot boundary includes: dividing, by the network device, a fourth time domain resource that is in the R third time domain resources and that crosses a slot boundary into H+1 second time domain resources, where the fourth time domain resource is any one of the R third time domain resources that crosses a slot boundary, the fourth time domain resource crosses H slot boundaries, and H is a positive integer.

In a possible implementation of the second aspect, the H+1 second time domain resources include: one second time domain resource from a start symbol of the fourth time domain resource to the $1^{st}$ slot boundary in the H slot boundaries, H−1 second time domain resources that are H−1 slots in the middle, and one second time domain resource from the last slot boundary in the H slot boundaries to an end symbol of the fourth time domain resource.

In a possible implementation of the second aspect, the M second time domain resources include Q third time domain resources and a second time domain resource that is determined based on a fourth time domain resource, and the Q third time domain resources are time domain resources that are in the R third time domain resources and that do not cross a slot boundary; and the fourth time domain resource is any one of the R third time domain resources that crosses a slot boundary, the fourth time domain resource crosses H slot boundaries, and H+1 second time domain resources determined based on the fourth time domain resource include: one second time domain resource from a start symbol of the fourth time domain resource to the $1^{st}$ slot boundary in the H slot boundaries, H−1 second time domain resources that are H−1 slots in the middle, and one second time domain resource from the last slot boundary in the H slot boundaries to an end symbol of the fourth time domain resource.

In a possible implementation of the second aspect, R is greater than M.

In a possible implementation of the second aspect, the dividing, by the network device based on a slot boundary, a time domain resource that is in the R third time domain resources and that crosses a slot boundary includes: dividing, by the network device, a fourth time domain resource that is in the R third time domain resources and that crosses a slot boundary into H+1 fifth time domain resources, where the fourth time domain resource is any one of the R third time domain resources that crosses a slot boundary, the fourth time domain resource crosses H slot boundaries, and H is a positive integer; combining, by the network device, the $1^{st}$ fifth time domain resource in the H+1 fifth time domain resources with the third time domain resource before the fourth time domain resource to form one second time domain resource; and combining the last fifth time domain resource in the H+1 fifth time domain resources with the third time domain resource after the fourth time domain resource to form one second time domain resource.

In a possible implementation of the second aspect, R is less than M.

In a possible implementation of the second aspect, the determining, by the network device, R third time domain resources based on the first time domain resource includes: repeating, by the network device, the first time domain resource for R times based on a quantity R of repetitions and intervals between the R third time domain resources, to obtain the R third time domain resources.

In a possible implementation of the second aspect, the method further includes: sending, by the network device, seventh indication information to the terminal device, where the seventh indication information is used to indicate the intervals between the R third time domain resources.

In a possible implementation of the second aspect, the intervals between the R third time domain resources are O, or the R third time domain resources are consecutive in time domain.

In a possible implementation of the second aspect, the determining, by the network device, R third time domain resources based on the first time domain resource includes: dividing, by the network device, the first time domain resource into the R third time domain resources.

In a possible implementation of the second aspect, the dividing, by the network device, the first time domain resource into the R third time domain resources includes: dividing, by the network device, the first time domain resource into the R third time domain resources based on a quantity R of repetitions, where each of R−1 third time domain resources in the R third time domain resources has $\lfloor L/R \rfloor$ consecutive symbols, L is a quantity of consecutive symbols of the first time domain resource, and L is a positive integer.

In a possible implementation of the second aspect, the dividing the first time domain resource into the R third time domain resources includes: dividing the first time domain resource into the R third time domain resources based on a quantity of symbols of the first time domain resource before the $1^{st}$ slot boundary, where the first time domain resource crosses X slot boundaries, the quantity of symbols of the first time domain resource before the $1^{st}$ slot boundary is T, and a quantity of symbols of the last third time domain resource in the R third time domain resources is less than or equal to T.

In a possible implementation of the second aspect, the dividing the first time domain resource into the R third time domain resources includes: dividing the first time domain resource into X+1 time domain resources based on a slot boundary, where the first time domain resource crosses X slot boundaries, and a quantity of symbols of the first time domain resource before the $1^{st}$ slot boundary is T; dividing each of the X+1 time domain resources based on a length of T symbols; and if any one of the X+1 time domain resources has K symbols remained and K<T, using the K symbols as one third time domain resource, or adding the K symbols to a previous third time domain resource.

In a possible implementation of the second aspect, the dividing the first time domain resource into the R third time domain resources includes: dividing the first time domain resource into the R third time domain resources based on a quantity of symbols of the first time domain resource after the last slot boundary, where the first time domain resource crosses X slot boundaries, the quantity of symbols of the first time domain resource after the last slot boundary is Y, and a quantity of symbols of the last third time domain resource in the R third time domain resources is less than or equal to Y.

In a possible implementation of the second aspect, the dividing the first time domain resource into the R third time domain resources includes: dividing the first time domain resource into X+1 time domain resources based on a slot boundary, where the first time domain resource crosses X slot boundaries, and a quantity of symbols of the first time domain resource after the last slot boundary is Y; dividing each of the X+1 time domain resources based on a length of Y symbols; and if any one of the X+1 time domain resources has K symbols remained and K<Y, using the K symbols as one third time domain resource, or adding the K symbols to a previous third time domain resource.

In a possible implementation of the second aspect, the dividing, by the network device, the first time domain resource into the R third time domain resources includes: sending, by the network device, first indication information to the terminal device, where the first indication information is used to indicate a first division manner for the first time domain resource; and dividing, by the network device, the first time domain resource into the R third time domain resources in the first division manner, where the first time domain resource corresponds to a plurality of division manners, and the first division manner is one of the plurality of division manners.

In a possible implementation of the second aspect, the method further includes: sending, by the network device, second indication information to the terminal device, where the second indication information is used to indicate a value of the quantity R of repetitions.

In a possible implementation of the second aspect, the method further includes: sending, by the network device, third indication information to the terminal device, where the third indication information is used to indicate a start and length indicator value SLIV of the first time domain resource, and the SLIV, a start symbol S, and a length L satisfy the following mapping relationship:

if $(L-1) \leq \lfloor N/2 \rfloor$, SLIV=$N*(L-1)+S$.

otherwise, SLIV=$N*(N-L+1)+(N-1-S)$ where $0<L(N-S)$.

$N>14$; and

S is a number of a start symbol of the first time domain resource, S is an integer greater than or equal to o, L is the quantity of consecutive symbols of the first time domain resource, and L and N are positive integers.

In a possible implementation of the second aspect, the method further includes: sending, by the network device, third indication information to the terminal device, where the third indication information is used to indicate one row in a time domain resource table, one row in the time domain resource table includes a number S of a start symbol and the quantity L of consecutive symbols of the first time domain resource, S is an integer greater than or equal to o, and L is a positive integer. Optionally, the time domain resource table is configured by higher layer signaling.

In a possible implementation of the second aspect, the method further includes: sending fourth indication information to the terminal device, where the fourth indication information is used to indicate the quantity X of slot boundaries crossed by the first time domain resource, and X is a nonnegative integer; and sending fifth indication information to the terminal device, where the fifth indication information is used to indicate the number S of the start symbol and the reference length L of the first time domain resource, where the number of the start symbol of the first time domain resource is S, and the length of the first time domain resource is $L+(X-1)*14$ symbols.

In a possible implementation of the second aspect, the method further includes: sending sixth indication information to the terminal device, where the sixth indication information is used to indicate a quantity W of slots crossed by the first time domain resource, and W is a nonnegative integer; and sending fifth indication information to the terminal device, where the fifth indication information is used to indicate the number S of the start symbol and the reference length L of the first time domain resource, where the number of the start symbol of the first time domain resource is S, and the length of the first time domain resource is $L+W*14$ symbols.

According to a third aspect, a communications apparatus is provided. The apparatus includes units configured to perform the steps in the first aspect or any possible implementation of the first aspect.

According to a fourth aspect, a communications apparatus is provided. The apparatus includes units configured to perform the steps in the second aspect or any possible implementation of the second aspect.

According to a fifth aspect, a communications apparatus is provided. The apparatus includes at least one processor and a memory, and the at least one processor is configured to perform the method in the first aspect or any possible implementation of the first aspect.

According to a sixth aspect, a communications apparatus is provided. The apparatus includes at least one processor and a memory, and the at least one processor is configured to perform the method in the second aspect or any possible implementation of the second aspect.

According to a seventh aspect, a communications apparatus is provided. The apparatus includes at least one processor and an interface circuit, and the at least one processor is configured to perform the method in the first aspect or any possible implementation of the first aspect.

According to an eighth aspect, a communications apparatus is provided. The apparatus includes at least one processor and an interface circuit, and the at least one processor is configured to perform the method in the second aspect or any possible implementation of the second aspect.

According to a ninth aspect, a terminal device is provided. The terminal device includes the communications apparatus provided in the third aspect, or the terminal includes the communications apparatus provided in the fifth aspect, or the terminal includes the communications apparatus provided in the seventh aspect.

According to a tenth aspect, a network device is provided. The network device includes the communications apparatus provided in the fourth aspect, or the network device includes the communications apparatus provided in the sixth aspect, or the network device includes the communications apparatus provided in the eighth aspect.

According to an eleventh aspect, a computer program product is provided. The computer program product includes a computer program. When being executed by a processor, the computer program is used to perform the method in the first aspect or any possible implementation of the first aspect, or perform the method in the second aspect or any possible implementation of the second aspect.

According to a twelfth aspect, a computer-readable storage medium is provided. The computer-readable storage medium stores a computer program. When being executed, the computer program is used to perform the method in the first aspect or any possible implementation of the first aspect, or perform the method in the second aspect or any possible implementation of the second aspect.

DETAILED DESCRIPTION OF ILLUSTRATIVE EMBODIMENTS

The following describes technical solutions of this application with reference to the accompanying drawings.

The technical solutions in embodiments of this application may be applied to various communications systems, for example, a long term evolution (LTE) system, a new radio (NR) system in a 5th generation (5G) mobile communications system, or a future evolved mobile communications system. A mobile communications system used in the embodiments is not limited in this application.

Figure 1:
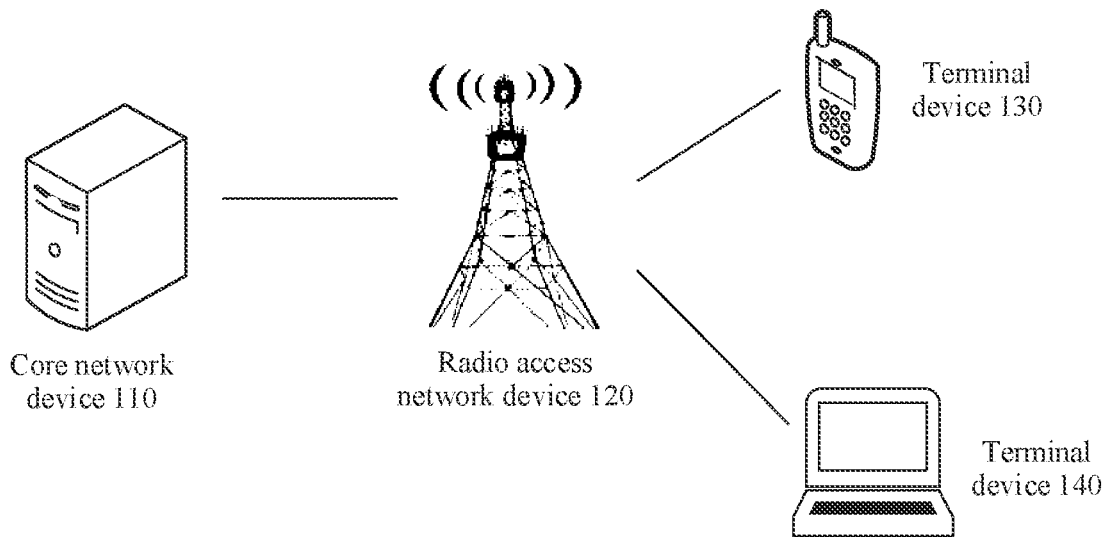
FIG. 1 is a schematic architectural diagram of a mobile communications system applicable to an embodiment of this application.

FIG. 1 is a schematic architectural diagram of a mobile communications system 100 applicable to an embodiment of this application. As shown in FIG. 1, the mobile communications system 100 may include a core network device 110, a radio access network device 120, and at least one terminal device (for example, a terminal device 130 and a terminal device 140 that are shown in FIG. 1). The terminal device is connected to the radio access network device in a wireless manner, and the radio access network device is connected to the core network device in a wireless or wired manner. The core network device and the radio access network device may be different physical devices independent of each other, or a function of the core network device and a logical function of the radio access network device may be integrated into one physical device, or a part of a function of the core network device and a part of a function of the radio access network device may be integrated into one physical device. The terminal device may be at a fixed location or may be mobile. FIG. 1 is merely a schematic diagram. The communications system may further include another network device, for example, may further include a wireless relay device and a wireless backhaul device, which are not drawn in FIG. 1. Quantities of core network devices, radio access network devices, and terminal devices included in the mobile communications system are not limited in the embodiments of this application.

The terminal device in the mobile communications system 100 may also be referred to as a terminal, user equipment (UE), a mobile station (MS), a mobile terminal (MT), or the like. The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, and the like. In this application, the foregoing terminal device and a chip that can be used in the foregoing terminal device are collectively referred to as a terminal device. It should be understood that a specific technology and a specific device form that are used for the terminal device are not limited in the embodiments of this application.

In the mobile communications system 100, the radio access network device 120 is an access device used by the terminal device to access the mobile communications system in a wireless manner. The radio access network device 120 may be a base station, an evolved NodeB (eNodeB), a home base station, an access point (AP) in a wireless-fidelity (Wi-Fi) system, a wireless relay node, a wireless backhaul node, a transmission point (TP), a transmission reception point (TRP), or the like; or may be a gNB in an NR system; or may be a component or some devices that constitute a base station, for example, a centralized unit (CU), a distributed unit (DU), or a baseband unit (BBU). It should be understood that a specific technology and a specific device form that are used for the radio access network device are not limited in the embodiments of this application. In this application, the radio access network device is briefly referred to as a network device. Unless otherwise specified, all network devices in this application are radio access network devices. In this application, the network device may be the network device, or may be a chip applied to the network device to complete a wireless communication processing function.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory. The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), or a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data.

To facilitate understanding of the embodiments of this application, the following briefly describes several concepts in this application.

Time domain resource (or time unit) and time domain symbol:

A time domain resource used for wireless communication between a base station and a terminal device may be divided into a plurality of time domain resources. In addition, in the embodiments of this application, the plurality of time domain resources may be consecutive, or some adjacent time domain resources may be spaced by preset intervals. This is not particularly limited in the embodiments of this application.

In the embodiments of this application, a length of one time domain resource is not limited. For example, one time domain resource may be one or more subframes, or may be one or more slots, or may be one or more symbols.

In the embodiments of this application, a symbol is also referred to as a time domain symbol, and may be an orthogonal frequency division multiplexing (OFDM) symbol, or may be a single-carrier frequency division multiple access (SC-FDMA) symbol. SC-FDMA is also referred to as orthogonal frequency division multiplexing with transform precoding (OFDM with TP).

In the embodiments of this application, there is a time sequence relationship between a plurality of time domain resources in time domain, and time lengths corresponding to any two time domain resources may be the same or may be different.

Compared with a 4G communications system, one of features of a 5G system is that a URLLC service is supported. There are a plurality of types of URLLC services. Typical examples include industrial control, industrial production process automation, man-machine interaction, telemedicine, and the like. To better quantize performance indicators of a URLLC service to provide a reference input and evaluation criterion for designing the 5G system, the performance indicators of the URLLC service are currently defined as follows:

Latency is defined as a transmission time required for a user application layer data packet to arrive at a service data unit (SDU) at a layer 2 or 3 of a wireless protocol stack at a receive end from an SDU at a layer 2 or 3 of a wireless protocol stack at a transmit end. A user plane latency requirement of the URLLC service is 0.5 ms for both uplink and downlink transmission. The performance requirement of 0.5 ms herein is only applicable to a case in which neither the transmit end (for example, a base station) nor the receive end (for example, a terminal) is in a discontinuous reception (DRX) state. In addition, the performance requirement of 0.5 ms herein refers to average latency of a data packet, and is not bound to the following reliability requirement.

Reliability is a success probability that the transmit end correctly transmits X-bit data to the receive end within a specific time (L seconds). The time (L seconds) is still defined as the transmission time required for a user application layer data packet to arrive at the SDU at the layer 2 or 3 of the wireless protocol stack at the receive end from the SDU at the layer 2 or 3 of the wireless protocol stack at the transmit end. For the URLLC service, a typical requirement is that reliability of sending 32 bytes of data within 1 ms reaches 99.999%. It should be noted that the foregoing performance indicators are merely typical values. A specific URLLC service may have a different requirement for reliability. For example, extremely stringent industrial control requires a transmission success probability of 99.9999999% within 0.25 ms of end-to-end latency.

In an existing technology, a process in which the terminal device determines a time domain resource for sending data to the network device (that is, uplink transmission) or determines a time domain resource for receiving data sent by the network device (that is, downlink transmission) mainly includes:

First, the terminal device determines a time domain resource table. The time domain resource table may include a parameter S and a parameter L, S represents a start symbol (or a number of a start symbol) of a data channel, and L (length) represents a quantity of symbols occupied by the data channel. Then, the terminal device receives indication information sent by the network device. The indication information is used to indicate one row in the time domain resource table, or the indication information may be used to indicate a start and length indicator value (SLIV) obtained by jointly encoding S and L in the time domain resource table. The time domain resource table may include the SLIV. The terminal device may determine a time domain resource based on the row or the SLIV indicated by the network device in the time domain resource table.

The following describes in detail the process in which the terminal device determines the time domain resource for sending data to the network device or determines the time domain resource for receiving data sent by the network device.

First, the terminal device determines a time domain resource table. The time domain resource table may be a time domain resource table specified in a protocol or a time domain resource table configured by higher layer signaling.

The time domain resource table specified in the protocol includes 16 rows, and each row includes: a parameter S, a parameter L, a parameter K2 or K0, and a physical downlink shared channel (PDSCH) mapping type or a physical uplink shared channel (PUSCH) mapping type.

S represents a number of a start symbol of a data channel, and S uses a slot boundary as a reference. L (length) represents a quantity of symbols occupied by the data channel, and may also be referred to as a quantity of consecutive symbols of the data channel, or may also be referred to as a time domain length of the data channel. L is the quantity of consecutive symbols starting from S. In the time domain resource table, a time domain resource determined based on S and L is definitely in a slot, and a time domain resource does not cross a slot boundary.

The parameter K2 exists only in the time domain resource table of uplink transmission, and the parameter K0 exists only in the time domain resource table of downlink transmission. In other words, the protocol specifies respective time domain resource tables for the uplink transmission and the downlink transmission. K2 represents a quantity of slots within an interval between receiving of a physical downlink control channel (PDCCH) and sending of a physical uplink shared channel (PUSCH). K0 represents a quantity of slots within an interval between receiving of a PDCCH and sending of a physical downlink shared channel (PDSCH).

The PDSCH mapping type is mainly used to determine a time domain symbol position of a demodulation reference signal (DMRS) of the PDSCH, and may further be used to determine all proper start positions, proper duration, and the like of the PDSCH. There are two types of PDSCH mapping: type A and type B. Type A indicates that a position of the 1$^{st}$ DMRS is in the 3$^{rd}$ or 4$^{h}$ symbol of a slot, and type B indicates that a position of the 1$^{st}$ DMRS is in the 1$^{st}$ symbol in which data starts.

The time domain resource table configured by higher layer signaling has a maximum of 16 rows, and each row includes the following parameters: an SLIV, a parameter K2 or K0, and a PDSCH mapping type or a PUSCH mapping type.

The SLIV value is a result obtained by jointly encoding S and L. The SLIV, S, and L satisfy the following mapping relationship:

if $(L-1) \leq 7$, SLIV$=14*(L-1)+S$.

otherwise, SLIV$=14*(14-L+1)+(14-1-S)$, where $0 \leq L \leq (14-S)$

In this application, the mapping relationship is referred to as a mapping relationship (1). A value of S ranges from 0 to 13. With reference to the foregoing mapping relationship (1), it can be learned that the time domain resource determined based on S and L does not cross a slot boundary. According to the foregoing mapping relationship (1), one SLIV value may uniquely determine one combination of the value of S and the value of L, and one combination of the value of S and the value of L may also uniquely determine one SLIV value.

Definitions of the parameter K2, the parameter K0, the PDSCH mapping type, and the PUSCH mapping type are similar to definitions of those in the time domain resource table specified in the protocol, and are not described herein again.

Table 1 and Table 2 further limit a combination of the value of S and the value of L for different mapping types. Table 1 is a combination table of valid S and L in a time domain resource for downlink transmission. Table 2 is a combination table of valid S and L in a time domain resource for uplink transmission.

TABLE 1

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S may be equal to 3 only when the DMRS is in the 4$^{th}$ symbol.

TABLE 2

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} |

DMRS is in the 3$^{rd}$ or 4$^{h}$ symbol of a slot, and type B indicates that a position of the 1$^{st}$ DMRS is in the 1$^{st}$ symbol in which data starts.

The PUSCH mapping type is mainly used to determine a time domain symbol position of a demodulation reference signal (DMRS) of the PUSCH, and may further be used to determine all proper start positions, proper duration, and the like of the PUSCH. There are two types of PUSCH mapping: type A and type B. Type A indicates that a position of the 1$^{st}$ Table 2 is used as an example for description. In a case of the PUSCH mapping type A and the normal cyclic prefix, the start symbol S can only be equal to o, and the length L may be any value from 4 to 14, but S+L cannot exceed 14. Because a length of one slot is 14 symbols, if the value of S+L exceeds 14, it means that the time domain resource crosses a slot boundary, that is, exceeds a boundary of one slot and occupies a part of a next slot. Because a control channel is generally placed at a start position of a slot, and is not used to carry data, if a time domain resource occupies a part of a next slot, scheduling of the network device and transmission of data are affected. Therefore, S+L cannot exceed 14, and the value of S is less than or equal to 13.

After determining a time domain resource table, for example, after using a time domain resource table specified in a protocol, the terminal device receives a PDCCH sent by the network device. The PDCCH carries downlink control information (DCI). The DCI includes a field whose length is X bits. The field is used to indicate one row in the time domain resource table, so as to indicate a start symbol S and a length L of a data channel. The terminal device may alternatively receive higher layer signaling sent by the network device. The higher layer signaling indicates one row in the time domain resource table, that is, indicates a start symbol S and a length L of a data channel.

For another example, after receiving the time domain resource table configured by using the higher layer signaling, the terminal device further receives a PDCCH sent by the network device or higher layer signaling sent by the network device. The PDCCH or the higher layer signaling is used to indicate one row in the time domain resource table configured by using the higher layer signaling. According to the foregoing descriptions, each row in the time domain resource table includes one SLIV value, and the SLIV may be determined based on the foregoing mapping relationship (1). Values of S and L should meet the conditions in Table 1 and Table 2. The terminal device determines S and L based on the SLIV value, and then may determine the position of the time domain resource based on S and L.

According to the foregoing method, the terminal device may determine the start symbol and the quantity of symbols of the time domain resource of the data channel. Then, data is sent to the network device on the time domain resource or data sent by the network device is received on the time domain resource. A method for determining, by the network device, the start symbol and the quantity of symbols of the time domain resource of the data channel is similar to the foregoing method.

In addition, the network device may further send higher layer signaling to the terminal device. The higher layer signaling is used to configure an aggregation factor. The aggregation factor is denoted as K, and K represents that data is transmitted in several consecutive slots. For example, if the terminal device determines that the start symbol of the data channel is a symbol 2, the length of the data channel is 4, and the aggregation factor is 2, it means that data is transmitted in two consecutive slots, the start symbol of the data in each slot is 2, and the length of the data is 4. The network device may further indicate a format of each slot to the terminal device by using higher layer signaling or DCI. The format of the slot indicates which symbols in the slot are uplink symbols, which symbols in the slot are downlink symbols, and which symbols in the slot are flexible symbols.

Uplink data transmission is used as an example. If the terminal device determines that data is transmitted in two consecutive slots, and a start symbol of data transmission in each slot is 2 and a length is 4, a format of each slot is determined based on higher layer signaling or DCI. If a time domain resource position in a slot conflicts with a downlink symbol, data transmission at the time domain resource position is canceled, or transmission is delayed to an uplink symbol position to continue data transmission.

In an existing technology, a resource for repeated data transmission can only be slot-level, that is, data transmission is repeated once in each slot, and repeated transmission is performed in K consecutive slots. In other words, repeated transmission can be performed only in a unit of slot, and is not allowed within one slot. This design cannot meet a requirement of a low-latency service such as a URLLC service.

Currently, support of repetition in a unit of mini-slot is suggested. One mini-slot is shorter than duration of one slot. For example, duration of one mini-slot may be two symbols, four symbols, or seven symbols. Mini-slot-level repetition may be understood as that an interval between start symbols or end symbols of time domain resources of any two consecutive mini-slots is fewer than 14 symbols. Latency of mini-slot-level data transmission is shorter than that of slot-level data transmission, and the latency can be further reduced while ensuring reliability of a plurality of repetitions.

For example, a start symbol of a time domain resource for transmission of data is 2, and a length of the time domain resource is four symbols. If mini-slot-level transmission is supported, and it is assumed that a quantity of repetitions is 2, the data may be transmitted twice on symbols 2 to 5 and symbols 6 to 9. In other words, the data may be repeatedly transmitted twice within one slot. If mini-slot-level transmission is not supported, repeated transmission needs to be performed in symbols 2 to 5 in a next slot.

However, currently, a method for determining resources of a plurality of mini-slots when data is repeatedly sent based on the plurality of mini-slots has not been determined, and there is no solution to a problem that the plurality of mini-slots cross a slot boundary.

Based on the foregoing problem, this application provides a data transmission method and a communications apparatus, to support repeated data transmission at a mini-slot level, resolve a data transmission problem caused when a plurality of mini-slots cross a slot boundary, further reduce data transmission latency, and improve data transmission reliability.

Figure 2:
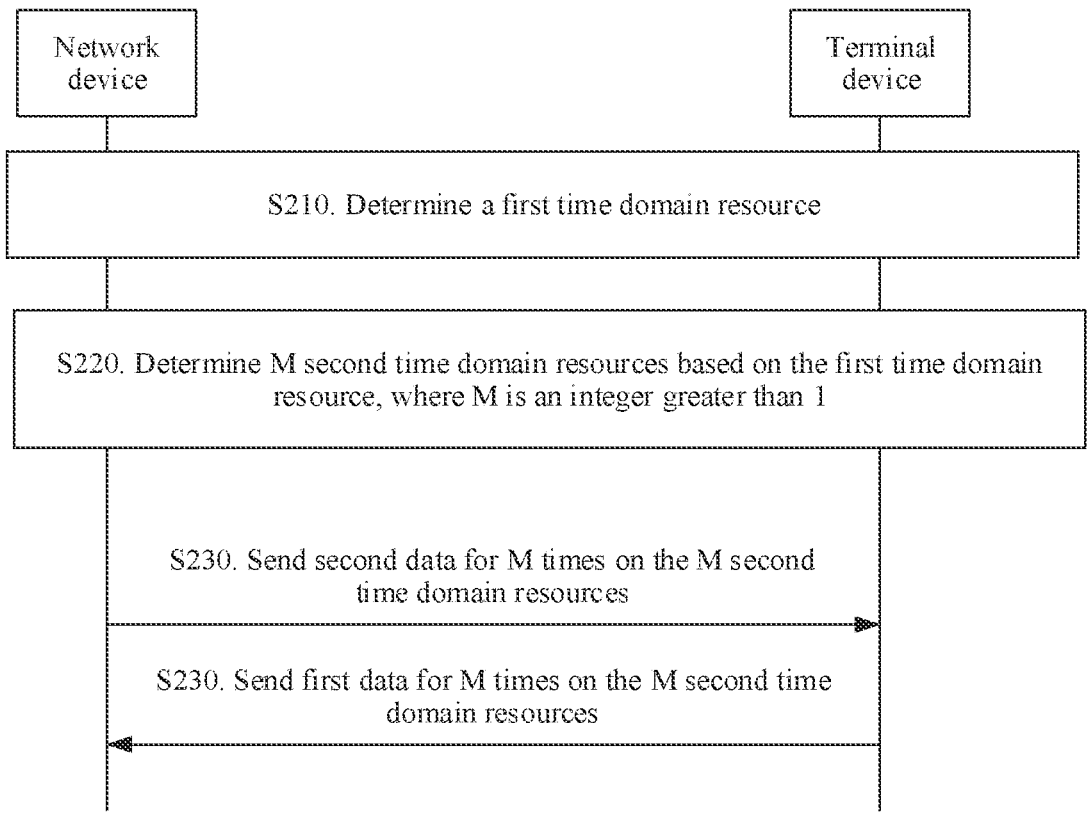
FIG. 2 is a schematic interaction diagram of an example of a data transmission method according to an embodiment of this application.

The following describes in detail a data transmission method provided in this application with reference to FIG. 2. FIG. 2 is a schematic interaction diagram of a data transmission method 200 according to an embodiment of this application. The method 200 may be applied to the scenario shown in FIG. 1, and certainly may also be applied to another communications scenario. This is not limited in this embodiment of this application.

According to the data transmission method provided in this application, first, M mini-slot-level second time domain resources that do not cross a slot boundary are determined based on a first time domain resource; and then, repeated mini-slot-level data transmission is performed on the M second time domain resources. The method reduces data transmission latency while improving data transmission reliability.

It should be understood that in this embodiment of this application, the method 200 is described by using an example in which steps of the method 200 are performed by a terminal device and a network device. As an example instead of a limitation, the steps of the method 200 may alternatively be performed by a chip applied to a terminal device and a chip applied to a network device.

As shown in FIG. 2, the method 200 includes the following steps.

S210. A terminal device and a network device determine a first time domain resource.

S220. The terminal device and the network device determine M second time domain resources based on the first time domain resource, where M is an integer greater than 1.

S230. For uplink data transmission, the terminal device sends first data to the network device for M times on the M second time domain resources; and correspondingly, the network device receives, on the M second time domain resources, the first data sent by the terminal device for M times. Alternatively, for downlink data transmission, the network device sends second data to the terminal device for M times on the M second time domain resources; and correspondingly, the terminal device receives, on the M second time domain resources, the second data sent by the network device for M times.

Specifically, when the terminal device needs to send data to the network device or the network device needs to send data to the terminal device, the terminal device or the network device needs to determine a time domain resource for sending the data. For example, the data may be data of a URLLC service or data of another type of service. That is, in S210, the terminal device or the network device determines the first time domain resource for sending the data.

The first time domain resource is a time domain resource used by the terminal device to send data or control information to the network device, and the first time domain resource has a determined slot boundary. A time length occupied by the first time domain resource may be fixed, in other words, the first time domain resource may be a block of time domain resource. The terminal device may send the data, the control information, or the like to the network device on all or some symbols included in the first time domain resource.

The time domain length of the first time domain resource may be greater than one slot, or may be less than one slot. In addition, the first time domain resource may or may not cross a slot boundary. The first time domain resource may be a time unit. All slots or symbols included in the first time domain resource may be used for uplink transmission, or all slots or symbols included in the first time domain resource may be used for downlink transmission, or some slots or symbols included in the first time domain resource are used for uplink transmission and other remaining symbols slots or symbols included in the first time domain resource are used for downlink transmission. For example, the first time domain resource includes a symbol 4 to a symbol 10. The symbol 4 to the symbol 10 may all be used for uplink transmission, or may all be used for downlink transmission, or the symbol 4 to the symbol 6 are used for uplink transmission and the symbol 7 to the symbol 10 are used for downlink transmission. This is not limited in this embodiment of this application.

In S220, the terminal device or the network device determines the M second time domain resources based on the first time domain resource, where M is an integer greater than 1. For example, for data of a URLLC service, data transmission reliability needs to be ensured and data transmission latency needs to be reduced. Therefore, after determining the first time domain resource, the terminal device or the network device determines the M second time domain resources based on the first time domain resource. M is an integer greater than 1.

It should be understood that a length of any one or more of the M second time domain resources may be less than one slot. For example, the M second time domain resources each may have a mini-slot-level length. None of the M second time domain resources crosses a slot boundary. The M second time domain resources may be consecutive, in other words, there is no time interval between two adjacent second time domain resources, or a time interval between two adjacent second time domain resources is o. Certainly, the M second time domain resources may alternatively be inconsecutive. For example, every two adjacent second time domain resources in the M second time domain resources are separated by two symbols. The M second time domain resources may be time domain resources used for uplink data transmission, or may be time domain resources used for downlink data transmission.

In S230, after the M second time domain resources are determined, if the M second time domain resources are time domain resources used for uplink data transmission, the terminal device sends the first data to the network device for M times on the M second time domain resources, to be specific, each second time domain resource is used to transmit the first data once, so that the first data is repeatedly transmitted for M times. That is, the M second time domain resources are used to repeatedly send a same data packet or transport block. Correspondingly, the network device receives, on the M second time domain resources, the first data sent by the terminal device for M times. If the M second time domain resources are time domain resources used for downlink data transmission, the network device sends the second data to the terminal device for M times on the M second time domain resources; and correspondingly, the terminal device receives, on the M second time domain resources, the second data sent by the network device for M times.

According to the data transmission method provided in this application, because data is repeatedly transmitted on the M second time domain resources, and the M second time domain resources are determined based on the first time domain resource, the M second time domain resources each may have a mini-slot-level length. In this way, data is repeatedly sent, data transmission latency is reduced, and data transmission reliability is improved.

Figure 3:
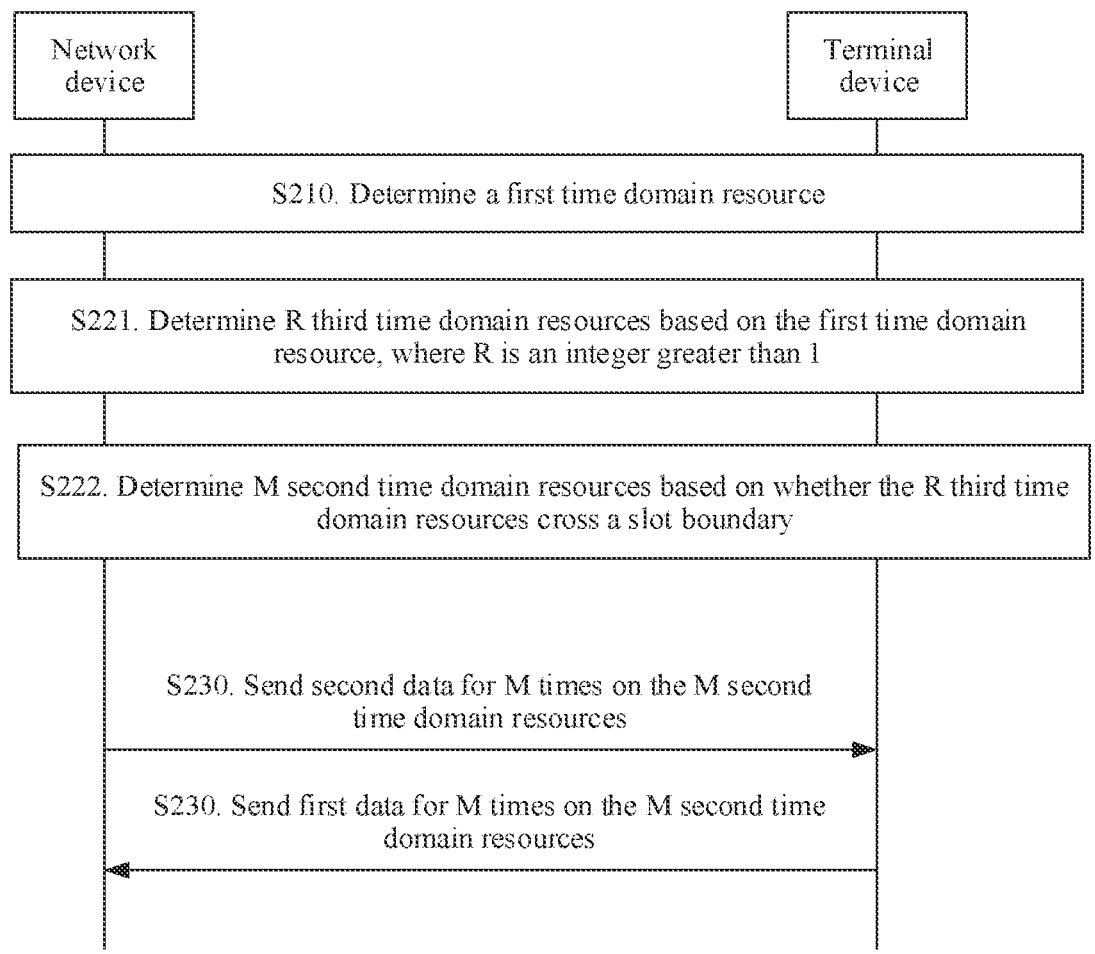
FIG. 3 is a schematic interaction diagram of another example of a data transmission method according to an embodiment of this application.

Optionally, in an embodiment, FIG. 3 is a schematic interaction diagram of a data transmission method according to another embodiment of this application. As shown in FIG. 3, in step S220, that the terminal device and the network device determine M second time domain resources based on the first time domain resource includes the following steps:

S221. The terminal device or the network device determines R third time domain resources based on the first time domain resource, where R is an integer greater than 1.

S222. The terminal device or the network device determines the M second time domain resources based on whether the R third time domain resources cross a slot boundary.

Specifically, the length of the first time domain resource may be greater than one slot, or may be less than one slot. As can be learned from the foregoing descriptions, if a time domain resource used to transmit data occupies a part of a next slot, scheduling of the network device and transmission of data are affected. Therefore, it needs to be ensured that none of the M second time domain resources crosses a slot boundary. To be specific, a slot boundary cannot be included between a start position and an ending position of each second time domain resource. For example, one slot includes 14 symbols numbered from 0 to 13. In this case, if a second time domain resource is the symbol 8 to the symbol 13, the second time domain resource does not cross a slot boundary; and if a second time domain resource is the symbol 12 to a symbol 2, that is, occupies the symbol 0, the symbol 1, and the symbol 2 of a next slot, the second time domain resource crosses a slot boundary. The first time domain resource may or may not cross a slot boundary. Therefore, in step S221, the terminal device or the network device first determines the R third time domain resources based on the first time domain resource, where R is an integer greater than 1. In this application, unless otherwise specified, it is assumed that one slot has 14 symbols numbered from 0 to 13.

It should be understood that a length of any one of the R third time domain resources may be greater than one slot, or may be less than one slot. In other words, any third time domain resource may or may not cross a slot boundary. The R third time domain resources each may have a mini-slot-level length. The R third time domain resources may be consecutive, in other words, there is no time interval between two adjacent third time domain resources, or a time interval between two adjacent third time domain resources is o. Certainly, the R third time domain resources may alternatively be inconsecutive. For example, every two adjacent third time domain resources in the R third time domain resources are separated by two symbols. The R third time domain resources may be time domain resources all used for uplink data transmission, or may be time domain resources all used for downlink data transmission. For each third time domain resource, all included symbols are used for uplink data transmission, or all included symbols are used for downlink data transmission. In other words, transmission directions of all symbols included in one third time domain resource are the same. In addition, in the R third time domain resources, two adjacent time domain resources are used to transmit data in a same direction, for example, used to transmit data in an uplink direction or in a downlink direction. In other words, the R third time domain resources are time domain resources used for uplink data transmission, or are time domain resources used for downlink data transmission.

In step S222, after determining the R third time domain resources, the terminal device or the network device determines the M second time domain resources based on whether the R third time domain resources cross a slot boundary. Because it needs to be ensured that none of the M second time domain resources crosses a slot boundary, the M second time domain resources are determined based on whether the R third time domain resources cross a slot boundary, so that it can be ensured that none of the M second time domain resources crosses a slot boundary, thereby ensuring reliability of data transmission on the M second time domain resources while reducing data transmission latency, and improving data transmission efficiency.

Figure 4:
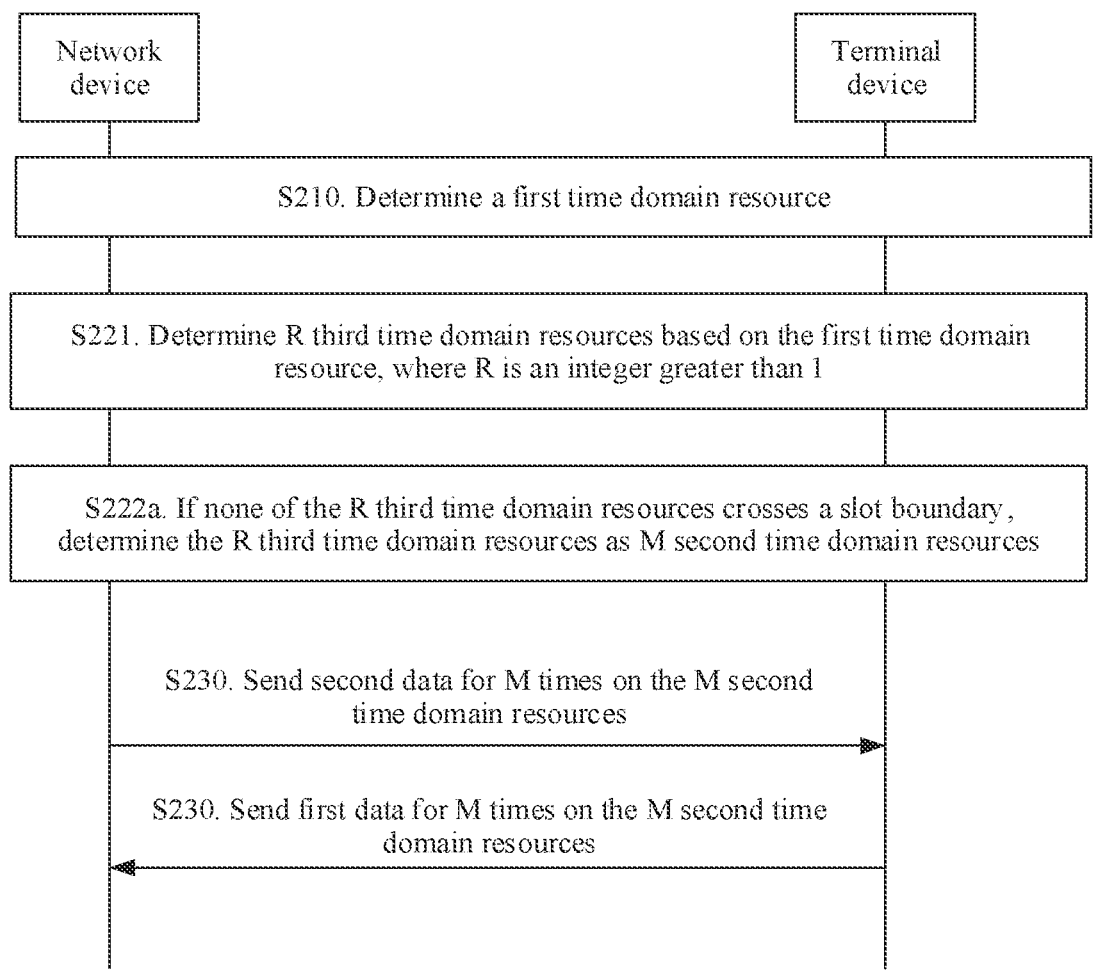
FIG. 4 is a schematic interaction diagram of another example of a data transmission method according to an embodiment of this application.

Optionally, in an embodiment, FIG. 4 is a schematic interaction diagram of a data transmission method according to another embodiment of this application. As shown in FIG. 4, in step S222, that the terminal device or the network device determines the M second time domain resources based on whether the R third time domain resources cross a slot boundary includes the following step:

S222a. If none of the R third time domain resources crosses a slot boundary, determine the R third time domain resources as the M second time domain resources, where M is equal to R.

Specifically, it needs to be ensured that none of the M second time domain resources crosses a slot boundary, and the M second time domain resources are determined based on the R third time domain resources. Therefore, if none of the R third time domain resources crosses a slot boundary, that is, all the R third time domain resources meet the requirement, the R third time domain resources may be directly determined as the M second time domain resources. That is, values of R and M are equal. The R third time domain resources are the M second time domain resources.

Figure 5:
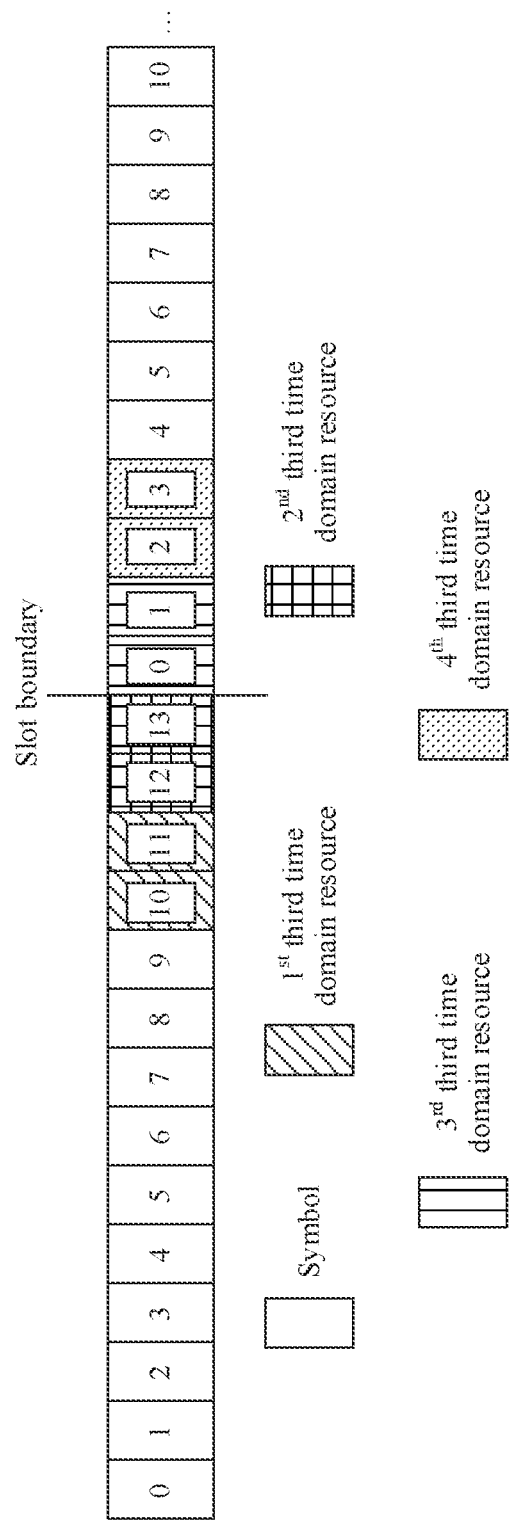
FIG. 5 is a schematic diagram of third time domain resources according to an embodiment of this application.

For example, FIG. 5 is a schematic diagram of third time domain resources according to an embodiment of this application. In FIG. 5, a value of R is 4, that is, there are four third time domain resources. The $1^{st}$ third time domain resource is a symbol 10 and a symbol 11, the $2^{nd}$ third time domain resource is a symbol 12 and a symbol 13, the $3^{rd}$ third time domain resource is a symbol 0 and a symbol 1 in a next slot, and the 4th third time domain resource is a symbol 2 and a symbol 3 in the next slot. It can be learned that none of the four third time domain resources crosses a slot boundary. In this case, the four third time domain resources are determined as four second time domain resources, that is, a value of M is 4. The $1^{st}$ second time domain resource is the symbol 10 and the symbol 11, the $2^{nd}$ second time domain resource is the symbol 12 and the symbol 13, the $3^{rd}$ second time domain resource is the symbol 0 and the symbol 1 in the next slot, and the $4^{th}$ second time domain resource is the symbol 2 and the symbol 3 in the next slot.

Figure 6:
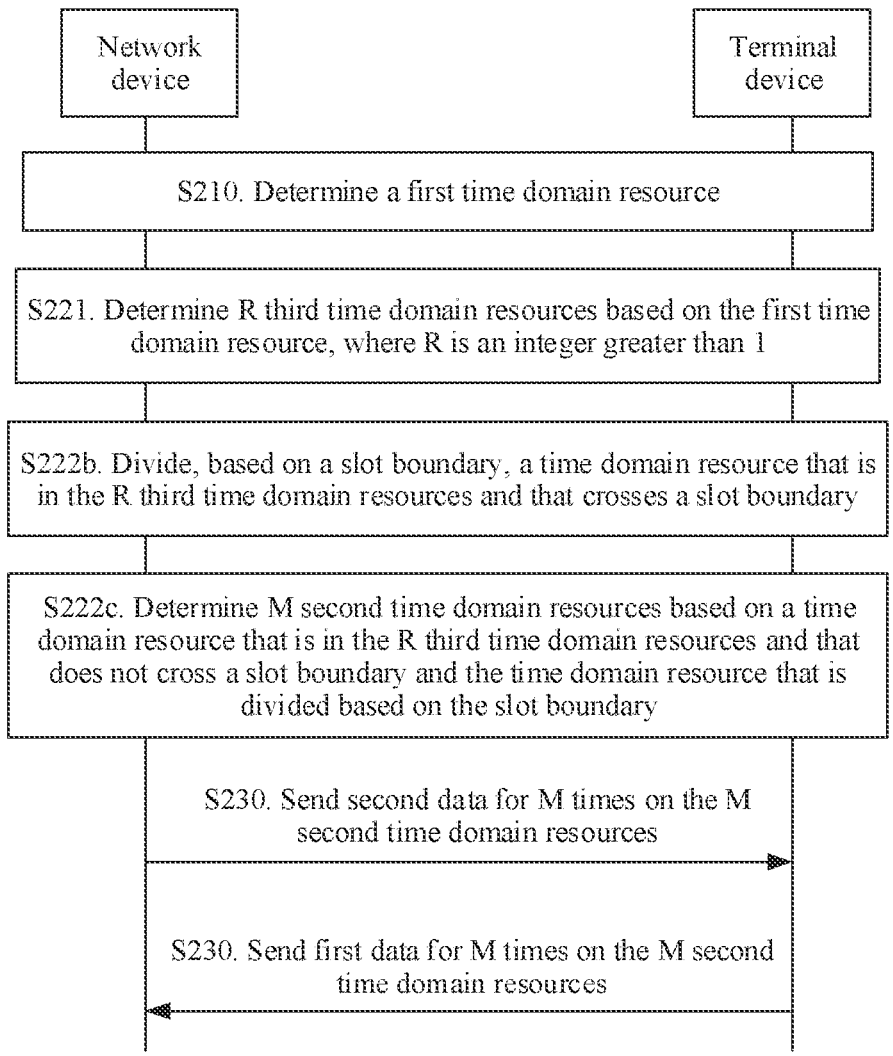
FIG. 6 is a schematic interaction diagram of an example of a data transmission method according to an embodiment of this application.

Optionally, in an embodiment, FIG. 6 is a schematic interaction diagram of a data transmission method according to another embodiment of this application. As shown in FIG. 6, in step S222, that the terminal device or the network device determines the M second time domain resources based on whether the R third time domain resources cross a slot boundary includes the following steps:

S222b. The terminal device or the network device divides, based on a slot boundary, a time domain resource that is in the R third time domain resources and that crosses a slot boundary.

S222c. The terminal device or the network device determines the M second time domain resources based on a time domain resource that is in the R third time domain resources and that does not cross a slot boundary and the time domain resource that is divided based on the slot boundary.

Specifically, it needs to be ensured that none of the M second time domain resources crosses a slot boundary, and the M second time domain resources are determined based on the R third time domain resources. Therefore, in step S222b, if there is a third time domain resource in the R third time domain resources that crosses a slot boundary, the time domain resource that is in the R third time domain resources and that crosses the slot boundary further needs to be divided based on the slot boundary, to ensure that a time domain resource obtained through division does not cross the slot boundary. In step S222c, the terminal device or the network device determines the M second time domain resources based on the time domain resource that is in the R third time domain resources and that does not cross the slot boundary and the time domain resource that is divided based on the slot boundary.

Figure 7:
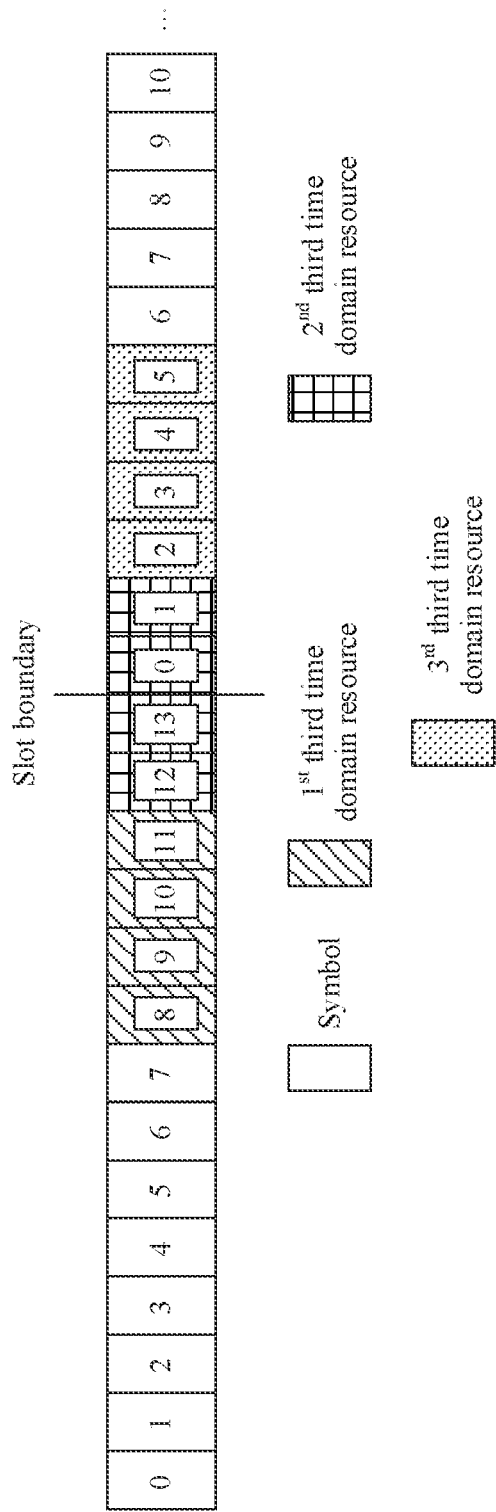
FIG. 7 is a schematic diagram of third time domain resources according to an embodiment of this application.

For example, FIG. 7 is a schematic diagram of third time domain resources according to an embodiment of this application. In FIG. 7, a value of R is 3, that is, there are three third time domain resources. The $1^{st}$ third time domain resource is a symbol 8 to a symbol 11, the $2^{nd}$ third time domain resource is a symbol 12 to a symbol 1 in a next slot, and the 3rd third time domain resource is a symbol 2 to a symbol 5 in the next slot. It can be learned that the $2^{nd}$ third time domain resource crosses a slot boundary. In this case, the $2^{nd}$ third time domain resource needs to be divided based on the slot boundary. Then, the M second time domain resources are determined based on a time domain resource obtained after division and a time domain resource that is not divided.

In a specific implementation, a fourth time domain resource that is in the R third time domain resources and that crosses a slot boundary is divided into H+1 second time domain resources, where the fourth time domain resource is any one of the R third time domain resources that crosses a slot boundary. The fourth time domain resource crosses H slot boundaries, where H is a positive integer. To be specific, if one of the R third time domain resources crosses H slot boundaries, the third time domain resource is divided into H+1 second time domain resources by the slot boundaries, and a same data packet or transport block is transmitted on each second time domain resource. The M second time domain resources include the H+1 second time domain resources and a third time domain resource that is in the R third time domain resources and that does not cross a boundary.

Figure 8:
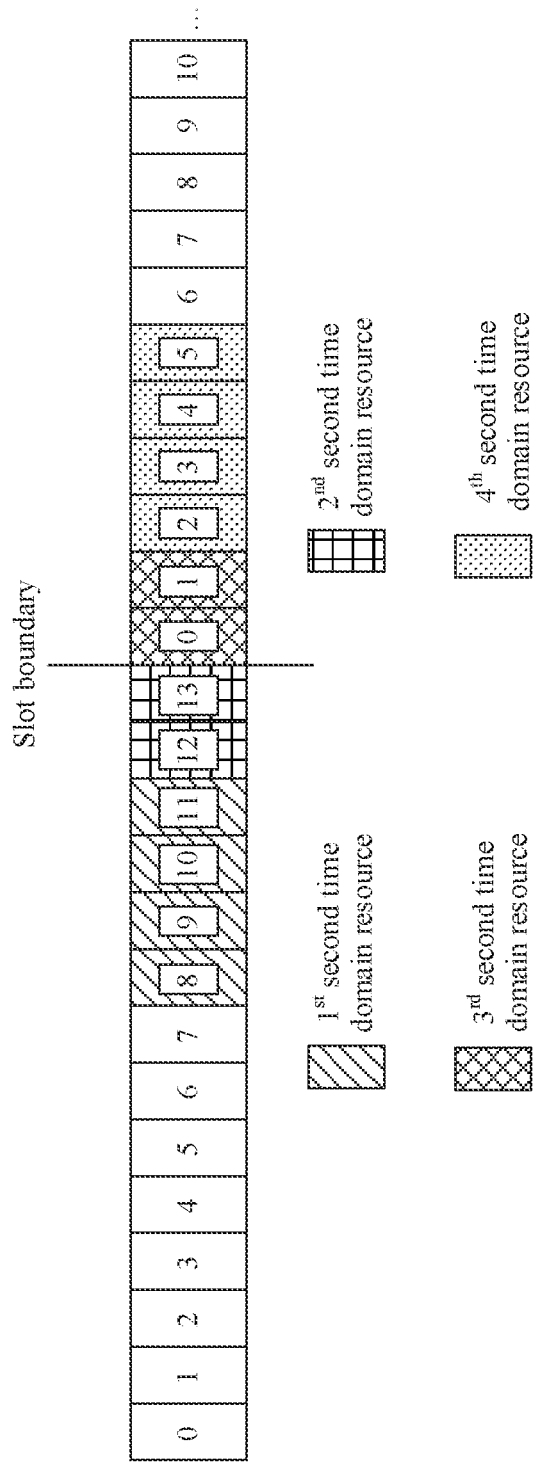
FIG. 8 is a schematic diagram of second time domain resources according to an embodiment of this application.

For example, FIG. 8 is a schematic diagram of second time domain resources according to an embodiment of this application. The second time domain resources shown in FIG. 8 may be obtained by dividing the three third time domain resources shown in FIG. 7. The $2^{nd}$ third time domain resource in FIG. 7 is the symbol 12 to the symbol 1 in the next slot. That is, the $2^{nd}$ third time domain resource is the fourth time domain resource, and crosses only one slot boundary, that is, H=1. In this case, the $2^{nd}$ third time domain resource needs to be divided, based on the slot boundary, into two time domain resources: a time resource from the symbol 12 to the symbol 13 and a time resource from the symbol 0 to the symbol 1 in the next slot. In this way, four second time domain resources may be obtained in total. As shown in FIG. 8, none of the second time domain resources crosses a slot boundary. Start symbols and end symbols of the four second time domain resources are respectively: the symbol 8 and the symbol 11, the symbol 12 and the symbol 13, the symbol 0 and the symbol 1 in the next slot, and the symbol 2 and the symbol 5 in the next slot.

In another specific implementation, a fourth time domain resource that is in the R third time domain resources and that crosses a slot boundary is divided into H+1 fifth time domain resources, where the fourth time domain resource is any one of the R third time domain resources that crosses a slot boundary, the fourth time domain resource crosses H slot boundaries, and H is a positive integer. The $1^{st}$ fifth time domain resource in the H+1 fifth time domain resources is combined with the third time domain resource before the fourth time domain resource to jointly form one second time domain resource. The last fifth time domain resource in the H+1 fifth time domain resources is combined with the third time domain resource after the fourth time domain resource to form one second time domain resource. That is, if one of the R third time domain resources crosses H slot boundaries, the third time domain resource is the fourth time domain resource that crosses the slot boundaries. In this division manner, R is less than M.

It should be understood that except the $1^{st}$ and the last fifth time domain resources in the H+1 fifth time domain resources, H−1 fifth time domain resources in the middle may be used as H−1 second time domain resources.

It should be further understood that when the fourth time domain resource is the $1^{st}$ third time domain resource, the $1^{st}$ fifth time domain resource is directly used as the $1^{st}$ second time domain resource. Similarly, when the fourth time domain resource is the last third time domain resource, the last fifth time domain resource is directly used as the last second time domain resource.

It should be further understood that the finally determined M second time domain resources include the second time domain resources obtained after the combination, a third time domain resource that is in the R third time domain resources and that does not cross a boundary, and the foregoing H−1 second time domain resources.

Figure 9:
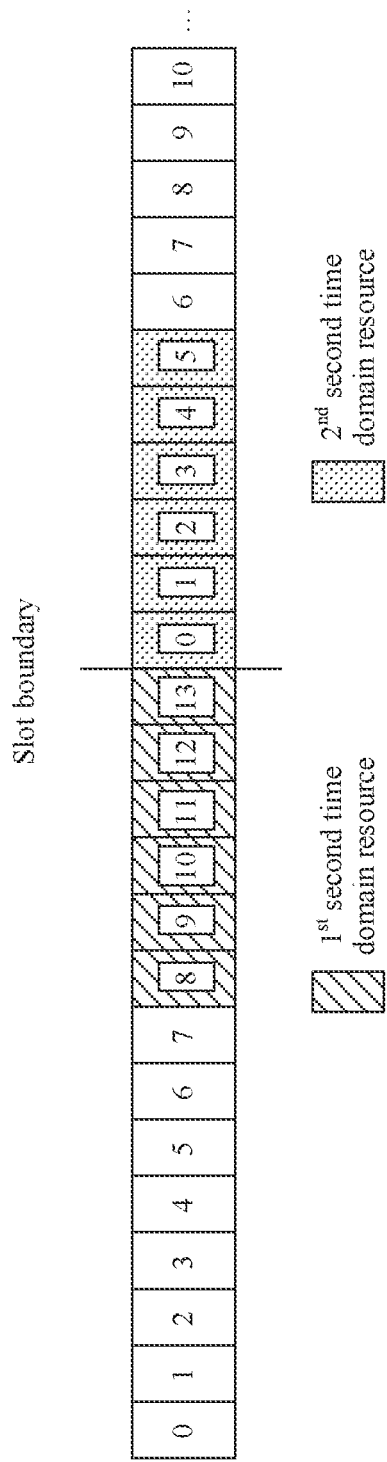
FIG. 9 is a schematic diagram of second time domain resources according to another embodiment of this application.

For example, FIG. 9 is a schematic diagram of second time domain resources according to an embodiment of this application. The second time domain resources shown in FIG. 9 may be obtained by dividing the three third time domain resources shown in FIG. 7. The $2^{nd}$ third time domain resource in FIG. 7 is the symbol 12 to the symbol 1 in the next slot. That is, the $2^{nd}$ third time domain resource is the fourth time domain resource, and crosses only one slot boundary, that is, H=1. In this case, the $2^{nd}$ third time domain resource needs to be divided, based on the slot boundary, into two fifth time domain resources: the $1^{st}$ fifth time resource from the symbol 12 to the symbol 13 and the $2^{nd}$ fifth time resource from the symbol 0 to the symbol 1 in the next slot. The $1^{st}$ fifth time domain resource is integrated into the third time domain resource before the fourth time domain resource, that is, the $1^{st}$ fifth time domain resource is integrated into the $1^{st}$ third time domain resource. After the integration, the $1^{st}$ second time domain resource becomes the symbol 8 to the symbol 13. The $2^{nd}$ fifth time domain resource is integrated into the third time domain resource after the fourth time domain resource, that is, the $2^{nd}$ fifth time domain resource is integrated into the $3^{rd}$ third time domain resource. After the integration, the $2^{nd}$ second time domain resource is the symbol 0 to the symbol 5 in the next slot. That is, two second time domain resources are obtained.

Optionally, in an embodiment, in step S222, that the terminal device or the network device determines the M second time domain resources based on whether the R third time domain resources cross a slot boundary includes the following manners.

Manner 1: If Q third time domain resources in the R third time domain resources do not cross a slot boundary, the Q third time domain resources are determined as Q second time domain resources.

If the R third time domain resources include a third time domain resource crossing a slot boundary, the third time domain resource crossing the slot boundary is referred to as a fourth time domain resource. If the fourth time domain resource crosses H slot boundaries, H+1 second time domain resources may be determined based on the fourth time domain resource, and the H+1 second time domain resources include: one second time domain resource from a start symbol of the fourth time domain resource to the $1^{st}$ slot boundary, H−1 second time domain resources that are H−1 slots in the middle, and one second time domain resource from the last slot boundary to an end symbol of the fourth time domain resource.

The M second time domain resources include the Q second time domain resources and the H+1 second time domain resources. It can be learned from Manner 1 that final R is less than M.

For example, FIG. 7 is a schematic diagram of third time domain resources according to an embodiment of this application. In FIG. 7, a value of R is 3, that is, there are three third time domain resources. The $1^{st}$ third time domain resource is a symbol 8 to a symbol 11, the $2^{nd}$ third time domain resource is a symbol 12 to a symbol 1 in a next slot, and the $3^{rd}$ third time domain resource is a symbol 2 to a symbol 5 in the next slot. It can be learned that the $2^{nd}$ third time domain resource crosses a slot boundary. According to the method described in Manner 1, the M second time domain resources determined based on the R third time domain resources may be shown in FIG. 8.

FIG. 8 is a schematic diagram of second time domain resources according to an embodiment of this application. The second time domain resources shown in FIG. 8 may be determined based on the three third time domain resources shown in FIG. 7. According to the method described in Manner 1, because neither the $1^{st}$ third time domain resource nor the $3^{rd}$ third time domain resource in FIG. 7 crosses a boundary, the two third time domain resources are determined as the $1^{st}$ second time domain resource and the $4^{th}$ second time domain resource in FIG. 8. The $2^{nd}$ third time domain resource in FIG. 7 is the symbol 12 to the symbol 1 in the next slot. That is, the $2^{nd}$ third time domain resource is the fourth time domain resource, and crosses only one slot boundary, that is, H=1. In this case, two second time domain resources may be determined based on the fourth time domain resource: a time resource from the symbol 12 to the symbol 13 and a time resource from the symbol 0 to the symbol 1 in the next slot. In this way, four second time domain resources may be obtained in total. As shown in FIG. 8, none of the second time domain resources crosses a slot boundary. Start symbols and end symbols of the four second time domain resources are respectively: the symbol 8 and the symbol 11, the symbol 12 and the symbol 13, the symbol 0 and the symbol 1 in the next slot, and the symbol 2 and the symbol 5 in the next slot.

Manner 2: If the R third time domain resources include a third time domain resource crossing a slot boundary, the third time domain resource crossing the slot boundary is referred to as a fourth time domain resource. If the fourth time domain resource crosses H slot boundaries, H+1 second time domain resources that may be determined based on the fourth time domain resource include: one second time domain resource from a start symbol of the third time domain resource before the fourth time domain resource to the $1^{st}$ slot boundary, H−1 second time domain resources that are H−1 slots in the middle, and one second time domain resource from the last slot boundary to an end symbol of the third time domain resource after the fourth time domain resource. It should be noted that if the fourth time domain resource is the $1^{st}$ third time domain resource, the H+1 second time domain resources include: one second time domain resource from a start symbol of the fourth time domain resource to the $1^{st}$ slot boundary, H−1 second time domain resources that are H−1 slots in the middle, and one second time domain resource from the last slot boundary to an end symbol of the third time domain resource after the fourth time domain resource; or if the fourth time domain resource is the last third time domain resource, the H+1 second time domain resources include: one second time domain resource from a start symbol of the third time domain resource before the fourth time domain resource to the $1^{st}$ slot boundary, H−1 second time domain resources that are H−1 slots in the middle, and one second time domain resource from the last slot boundary to an end symbol of the fourth time domain resource.

The fifth time domain resource is any one of the R third time domain resources that does not cross a slot boundary, and neither the third time domain resource before the fifth time domain resource nor the third time domain resource after the fifth time domain resource crosses a slot boundary. In this case, the fifth time domain resource is a second time domain resource.

The M second time domain resources include a second time domain resource determined based on the fourth time domain resource and a second time domain resource determined based on the fifth time domain resource.

For example, FIG. 9 is a schematic diagram of second time domain resources according to an embodiment of this application. The second time domain resources shown in FIG. 9 may be determined based on the three third time domain resources shown in FIG. 7. According to the method described in Manner 2, the $2^{nd}$ third time domain resource in FIG. 7 is the symbol 12 to the symbol 1 in the next slot. That is, the $2^{nd}$ third time domain resource is the fourth time domain resource, and crosses only one slot boundary, that is, H=1. In this case, two second time domain resources may be determined based on the fourth time domain resource. The first part of the fourth time resource is from the symbol 12 to the symbol 13, and the second part of the fourth time resource is from the symbol 0 to the symbol 1 in the next slot. The first part is integrated into the third time domain resource before the fourth time domain resource. After the integration, the $1^{st}$ second time domain resource becomes the symbol 8 to the symbol 13. The second part is integrated into the third time domain resource after the fourth time domain resource, that is, integrated into the $3^{rd}$ third time domain resource. After the integration, the $2^{nd}$ second time domain resource is the symbol 0 to the symbol 5 in the next slot. There is no fifth time domain resource in the three third time domain resources. To be specific, a third time domain resource that does not cross a slot boundary and whose previous and following third time domain resources do not cross a boundary either does not exist. For example, although the $1^{st}$ third time domain resource does not cross a boundary, the following third time domain resource crosses a boundary; or although the third time domain resource does not cross a boundary, but the previous third time domain resource crosses a boundary. Therefore, two second time domain resources are obtained in total.

Manner 3: The fourth time domain resource is divided based on a position of the fourth time domain resource that is in the R third time domain resources and that crosses a slot boundary and a quantity of slot boundaries that are crossed by the fourth time domain resource.

The M second time domain resources are determined based on a time domain resource that is in the R third time domain resources and that does not cross a slot boundary and time domain resources obtained by dividing the fourth time domain resource, where R is equal to M.

Specifically, if the first P third time domain resources in the R third time domain resources do not cross a boundary, the first P third time domain resources are the first P second time domain resources in the M second time domain resources.

If the $(P+1)^{th}$ third time domain resource in the R third time domain resources crosses a slot boundary, the $(P+1)^{th}$ second time domain resource in the M second time domain resources is a start symbol of the $(P+1)^{th}$ third time domain resource to a slot boundary. In this case, if P+1=R, the M second time domain resources include the P+1 second time domain resources; if P+1<R, the $(P+2)^{th}$ second time domain resource in the M second time domain resources is the slot boundary to an end symbol of the $(P+1)^{th}$ third time domain resource; if P+2=R, all the M second time domain resources include the P+2 second time domain resources; or if P+2<R, it continues to be determined whether a next third time domain resource, namely, the $(P+2)^{th}$ third time domain resource, in the R third time domain resources crosses a boundary.

If the $(P+2)^{th}$ third time domain resource in the R third time domain resources does not cross a boundary, the $(P+3)^{th}$ second time domain resource in the M second time domain resources is the $(P+2)^{th}$ third time domain resource; or if the $(P+2)^{th}$ third time domain resource in the R third time domain resources crosses a slot boundary, the $(P+3)^{h}$ second time domain resource in the M second time domain resources is a start symbol of the $(P+2)^{th}$ third time domain resource to a slot boundary. In this case, if P+3<R, the $(P+4)^{th}$ second time domain resource in the M second time domain resources is the slot boundary to an end symbol of the $(P+2)^{th}$ third time domain resource. If P+4=R, all the M second time domain resources include the P+4 second time domain resources; or if P+4<R, it continues to be determined whether a next third time domain resource, namely, the $(P+3)^{th}$ third time domain resource, in the R third time domain resources crosses a boundary. The procedure is repeated to determine the M second time domain resources.

It can be learned from the division step in Manner 3 that a quantity of finally determined M second time domain resources is equal to R.

Figure 10:
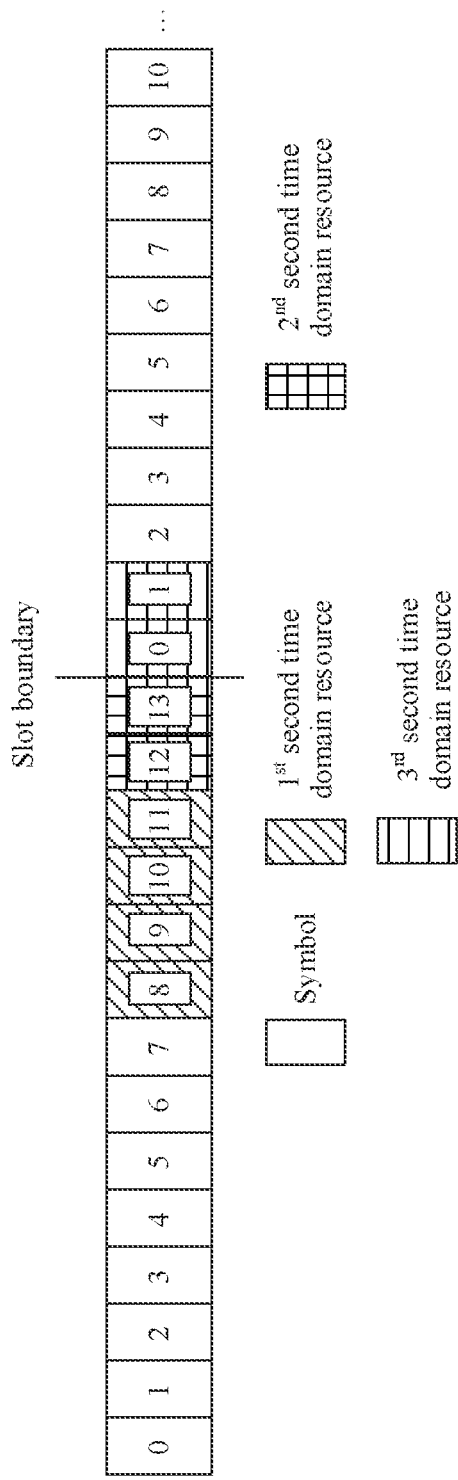
FIG. 10 is a schematic diagram of second time domain resources according to another embodiment of this application.

Descriptions are provided with reference to the example shown in FIG. 10. FIG. 10 is a schematic diagram of second time domain resources according to an embodiment of this application. The second time domain resources shown in FIG. 10 may be determined based on the three third time domain resources shown in FIG. 7. According to the method in Manner 3, because the $1^{st}$ third time domain resource in FIG. 7 does not cross a slot boundary, the $1^{st}$ third time domain resource is the $1^{st}$ second time domain resource, that is, the $1^{st}$ second time domain resource is the symbol 8 to the symbol 11, and P=1; because the $2^{nd}$ third time domain resource crosses a slot boundary, the $2^{nd}$ second time domain resource is the symbol 12 to the symbol 13; because P+1=2<R, the $3^{rd}$ second time domain resource is the symbol 0 to the symbol 1 in the next slot; because P+2=R, the M second time domain resources include the foregoing determined P+2 second time domain resources, that is, three second time domain resources: a time domain resource from the symbol 8 to the symbol 11, a time domain resource from the symbol 12 to the symbol 13, and a time domain resource from the symbol 0 to the symbol 1 in the next slot.

In other words, because the $1^{st}$ third time domain resource in FIG. 7 does not cross a slot boundary, the $1^{st}$ third time domain resource is a sixth time domain resource, that is, the $1^{st}$ sixth time domain resource is the symbol 8 to the symbol 11, and P=1. If the $2^{nd}$ third time domain resource crosses a slot boundary, two sixth time domain resources may be determined based on the $2^{nd}$ third time domain resource: a time domain resource from the symbol 12 to the symbol 13 and a time domain resource from the symbol 0 to the symbol 1 in the next slot. The $3^{rd}$ third time domain resource does not cross a slot boundary, and a sixth time domain resource may be determined based on the third time domain resource: a time domain resource from the symbol 2 to the symbol 5 in the next slot. The M second time domain resources include the first three sixth time domain resources in the four sixth time domain resources, which are a time domain resource from the symbol 8 to the symbol 11, a time domain resource from the symbol 12 to the symbol 13, and a time domain resource from the symbol 0 to the symbol 1 in the next slot. Therefore, M is equal to 3, and R is equal to 3. M is equal to R, and both are equal to 3.

It should be understood that, in this embodiment of this application, in addition to the foregoing three manners of dividing a time domain resource that is in the R third time domain resources and that crosses a slot boundary and determining the M second time domain resources with reference to a time domain resource that is in the R third time domain resources and that does not cross a slot boundary, there is another implementation provided that none of the M second time domain resources crosses a slot boundary. This is not limited herein in this application.

Figure 11:
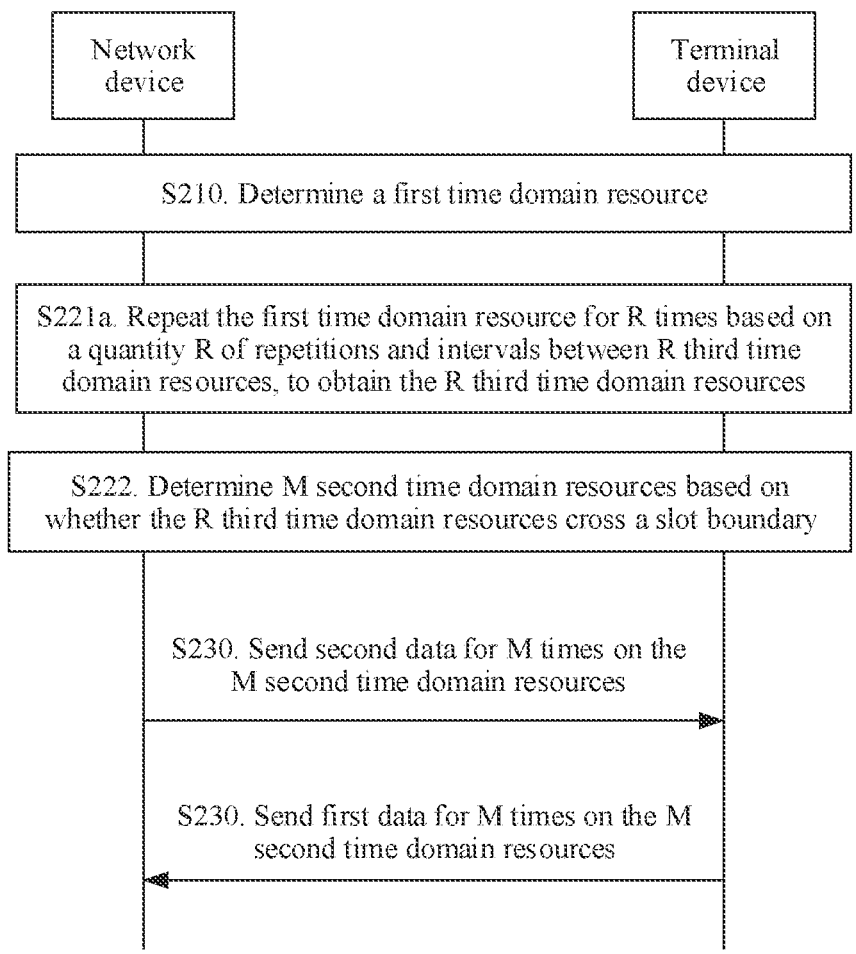
FIG. 11 is a schematic interaction diagram of another example of a data transmission method according to an embodiment of this application.

Optionally, in an embodiment, FIG. 11 is a schematic interaction diagram of a data transmission method according to another embodiment of this application. As shown in FIG. 11, in step S221, that the terminal device or the network device determines R third time domain resources based on the first time domain resource includes the following step:

S221a. The terminal device or the network device repeats the first time domain resource for R times based on a quantity R of repetitions and intervals between the R third time domain resources, to obtain the R third time domain resources.

Specifically, after the first time domain resource is determined, the R third time domain resources need to be determined based on the first time domain resource. In a possible manner, the first time domain resource is repeated for R times based on the quantity R of repetitions and the intervals between the R third time domain resources, to obtain the R third time domain resources.

Optionally, the quantity R of repetitions may be predefined in a protocol; or the network device may send second indication information to the terminal device, where the second indication information is used to indicate a value of the quantity R of repetitions. The second indication information may be further used to the intervals between the R third time domain resources. The second indication information may be carried in DCI or higher layer signaling. In this application, the higher layer signaling may be signaling sent by a higher-layer protocol layer. The higher-layer protocol layer is at least one protocol layer above a physical layer. The higher-layer protocol layer may specifically include at least one of the following protocol layers: a medium access control (MAC) layer, a radio link control (RLC) layer, a packet data convergence protocol (PDCP) layer, a radio resource control (RRC) layer, and a non-access stratum (NAS).

For example, it is assumed that the quantity R of repetitions is 4, a position of the $1^{st}$ time domain resource is a symbol 9 to a symbol 12, and a quantity of symbols that space the R third time domain resources away from each other is 0. In this case, the $1^{st}$ time domain resource is repeated for four times, and four third time domain resources are obtained. Start symbols and end symbols of the four third time domain resources are respectively: the symbol 9 and the symbol 12, a symbol 13 and a symbol 2, a symbol 3 and a symbol 6, and a symbol 7 and a symbol 10.

It should be understood that in this embodiment of this application, intervals between every two adjacent third time domain resources may be the same or may be different. The intervals between the R third time domain resources may be predefined, for example, may be specified in a protocol. The R third time domain resources are consecutive, in other words, the intervals between the R third time domain resources are 0; or the network device may send seventh indication information to the terminal device, where the seventh indication information is used to indicate the intervals between the R third time domain resources. The seventh indication information may directly indicate intervals between every two adjacent third time domain resources in the R third time domain resources, or may indirectly indicate the intervals between the R third time domain resources by indicating a mode of one first time domain resource. The seventh indication information may be carried in DCI or higher layer signaling. Optionally, the seventh indication information and the second indication information may be carried in same DCI or same higher layer signaling. Specifically, there are many implementations, for example:

The network device may directly notify the terminal device of the quantity R of repetitions and the intervals between the R third time domain resources by using indication information. Alternatively, the network device may notify the terminal device that the R third time domain resources are consecutive. If it is determined that the R third time domain resources are consecutive, it may be determined that the intervals between the R third time domain resources are 0. This is an implicit indication method. Alternatively, a correspondence between the intervals between the R third time domain resources and two parameters, a length of the first time domain resource and R, may be defined in advance. For example, a table may be stored, as shown in Table 3. Table 3 shows a case in which the intervals between every two adjacent third time domain resources are the same, that is, it is determined that the intervals between the R third time domain resources are the same. After the length of the first time domain resource and the quantity R of repetitions are determined, the intervals of the R third time domain resources may be determined. This is a predefined mode.

TABLE 3

| Length of the first time domain resource (unit: symbol) | Quantity R of repetitions | Interval between the R third time domain resources (unit: symbol) |
|---|---|---|
| 5 | 5 | 1 |
| 6 | 4 | 2 |
| 7 | 3 | 2 |
| 8 | 2 | 1 |
| 10 | 2 | 3 |

It should be understood that Table 3 is merely an example, and should not constitute any limitation on this embodiment of this application. For example, in this embodiment of this application, the intervals between the R third time domain resources may be partially the same or completely different. Alternatively, the intervals between the R third time domain resources may be determined in another manner. This is not limited in this embodiment of this application.

Figure 12:
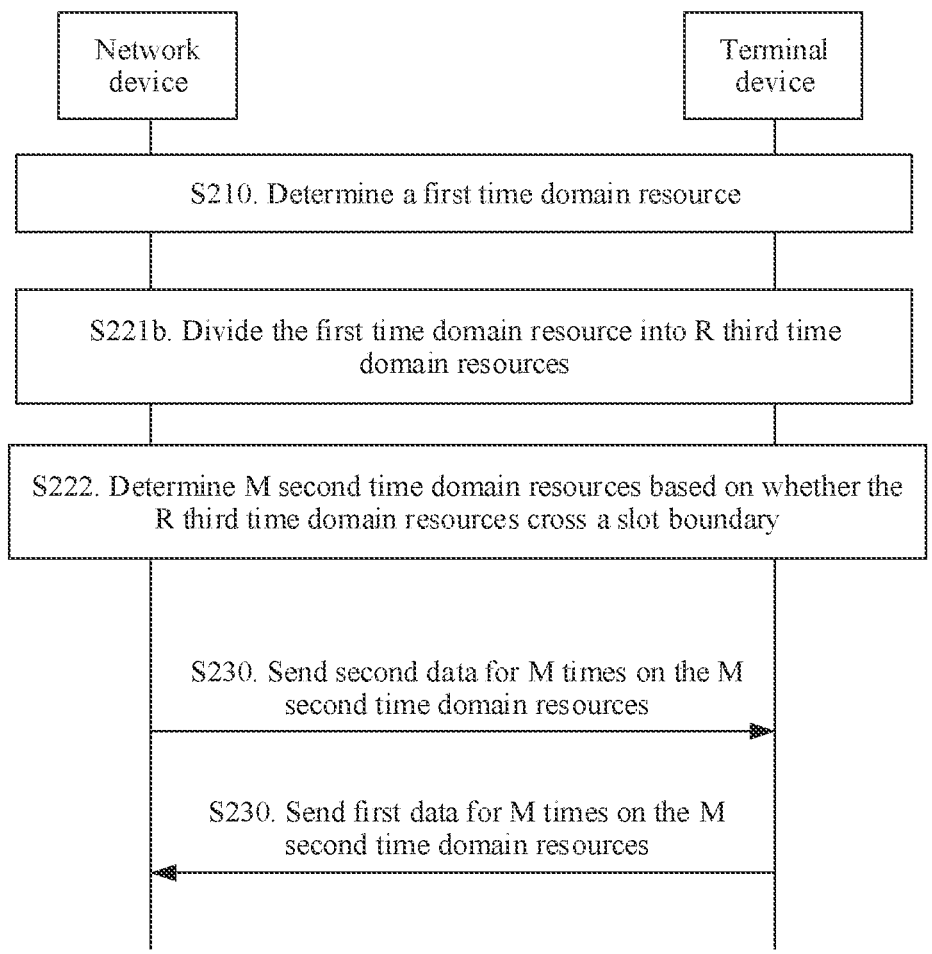
FIG. 12 is a schematic interaction diagram of another example of a data transmission method according to an embodiment of this application.

Optionally, in an embodiment, FIG. 12 is a schematic interaction diagram of a data transmission method according to another embodiment of this application. As shown in FIG. 12, in S221, that the terminal device or the network device determines R third time domain resources based on the first time domain resource includes the following step:

S221*b*. The terminal device or the network device divides the first time domain resource into the R third time domain resources.

Specifically, after the first time domain resource is determined, the R third time domain resources need to be determined based on the first time domain resource. In another possible manner, the first time domain resource is divided into R third time domain resources, in other words, a quantity of consecutive symbols of each of the R third time domain resources is less than or equal to a quantity of consecutive symbols of the first time domain resource. In a specific implementation, in step S221*b*, that the terminal device or the network device divides the first time domain resource into the R third time domain resources includes:

dividing the first time domain resource into the R third time domain resources based on a quantity R of repetitions, where each of R−1 third time domain resources in the R third time domain resources has $\lfloor L/R \rfloor$ consecutive symbols, L is the quantity of consecutive symbols of the first time domain resource, L is a positive integer, and $\lfloor \ \rfloor$ represents rounding down.

This implementation may alternatively be expressed as follows: The terminal device or the network device determines the R third time domain resources based on a quantity R of repetitions and the first time domain resource, where each of R−1 third time domain resources in the R third time domain resources has $\lfloor L/R \rfloor$ consecutive symbols, and the remaining third time domain resource has $L-(R-1)*\lfloor L/R \rfloor$ consecutive symbols, where L is the quantity of consecutive symbols of the first time domain resource, L is a positive integer, and $\lfloor \ \rfloor$ represents rounding down.

Specifically, after the first time domain resource is determined, the first time domain resource may be divided into the R third time domain resources based on the quantity R of repetitions. The quantity R of repetitions may be notified by the network device to the terminal device by using indication information, where the indication information may be carried in DCI or higher layer signaling, or may be predefined in a protocol. Each of the R−1 third time domain resources in the R third time domain resources has $\lfloor L/R \rfloor$ consecutive symbols, and the remaining third time domain resource has $L-(R-1)*\lfloor L/R \rfloor$ consecutive symbols.

For example, the first time domain resource is a symbol 10 in the $1^{st}$ slot to a symbol 4 in the $2^{nd}$ slot. In this case, a value of L of the quantity of consecutive symbols of the first time domain resource is 9. If it is determined that R is equal to 5, a calculation result of $\lfloor 9/5 \rfloor$ is 1. Each of four third time domain resources in the five third time domain resources has one symbol, and the remaining third time domain resource has five consecutive symbols. The four third time domain resources each having one symbol may be the first four third time domain resources, the last four third time domain resources, or any four third time domain resources. The four third time domain resources may be consecutive or inconsecutive.

If the quantity L of consecutive symbols of the first time domain resource can be divided by R exactly, each of the R third time domain resources may have a same quantity of consecutive symbols, which is L/R. In other words, the first time domain resource is evenly divided into R third time domain resources. Certainly, if the quantity L of consecutive symbols of the first time domain resource can be divided by R exactly, each of the R third time domain resources may alternatively have a different quantity of consecutive symbols.

It should be understood that if the L symbols of the first time domain resource include symbols in different directions (where for example, the first time domain resource is an uplink transmission resource, but the L symbols include a downlink symbol or a reserved symbol (for example, a reserved DMRS symbol)), L needs to be replaced with L' when the quantity of symbols occupied by each of the R third time domain resources is calculated, where L' is a quantity of symbols other than the downlink symbol and the reserved symbol in the L symbols.

For example, a start position of the first time domain resource is a $10^{th}$ symbol, the length L is 8, the first time domain resource is the symbol 10 in the $1^{st}$ slot to a symbol 3 in the $2^{nd}$ slot, and it is determined that R is equal to 4, but the first time domain resource includes four downlink symbols (the symbol 12 in the $1^{st}$ slot to the symbol 1 in the $2^{nd}$ slot). Therefore, original L needs to be replaced with L'=8−4=4. In this way, each third time domain resource occupies one symbol.

It should be further understood that all symbols included in the R third time domain resources are used for uplink transmission, or all symbols included in the R third time domain resources are used for downlink transmission.

For example, in the foregoing example, the start position of the first time domain resource is the $10^{th}$ symbol, the length L is 8, and the first time domain resource is the symbol 10 in the $1^{st}$ slot to the symbol 3 in the $2^{nd}$ slot, but the first time domain resource includes four downlink symbols (the symbol 12 in the $1^{st}$ slot to the symbol 1 in the $2^{nd}$ slot), each of the four third time domain resources occupies one symbol, and the four third time domain resources are: the symbol 10 in the $1^{st}$ slot, the symbol 11 in the 1st slot, the symbol 2 in the $2^{nd}$ slot, and the symbol 3 in the $2^{nd}$ slot. The four third time domain resources are all used for uplink transmission.

In another specific implementation, in step S221b, that the terminal device or the network device divides the first time domain resource into the R third time domain resources includes:
  dividing the first time domain resource into the R third time domain resources in the first division manner for the first time domain resource, where the first time domain resource corresponds to a plurality of division manners, and the first division manner is one of the plurality of division manners.

This implementation may also be expressed as: determining, by the terminal device or the network device, the R third time domain resources in the first division manner for the first time domain resource.

Figure 13:
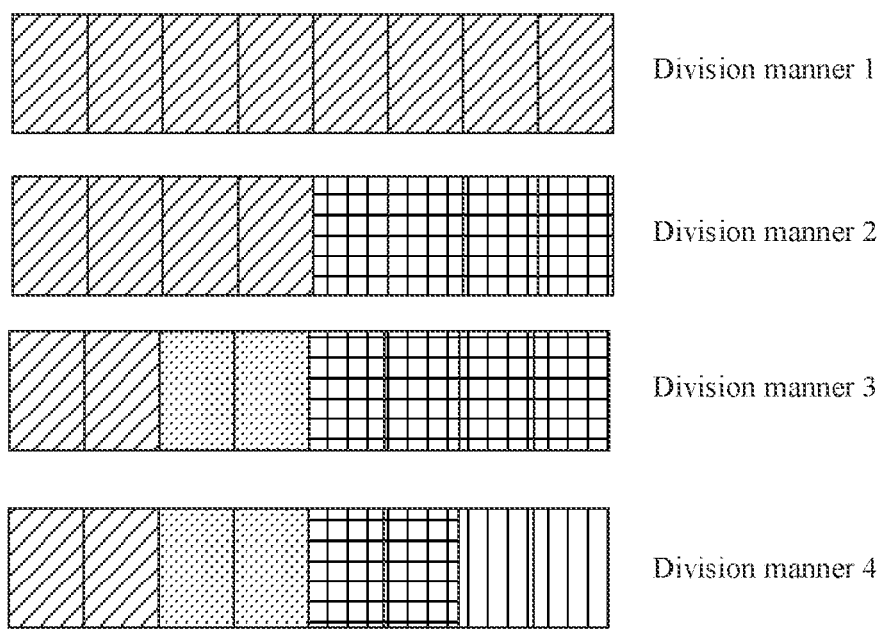
FIG. 13 is a schematic diagram of division manners for a first time domain resource having a symbol length of eight symbols according to an embodiment of this application.

Specifically, the first time domain resource of each length L may be predefined or configured to have several fixed division manners. For example, FIG. 13 is a schematic diagram of division manners for a first time domain resource having a length of eight symbols according to an embodiment of this application. It is assumed that there are four division manners for the first time domain resource whose length L is 8. In the division manner 1, the first time domain resource is divided as one third time domain resource. In the division manner 2, the first time domain resource is divided into two third time domain resources, where the first four symbols are one third time domain resource, and the last four symbols are one third time domain resource. In the division manner 3, the first time domain resource is divided into three third time domain resources, where the first two symbols are one third time domain resource, the last four symbols are one third time domain resource, and the remaining two symbols in the middle are one third time domain resource. In the division manner 4, the first time domain resource is divided into four third time domain resources, and every two symbols are one third time domain resource.

It should be understood that a division manner corresponding to a first time domain resource may be related only to a quantity L of consecutive symbols of the first time domain resource. If L is determined, a plurality of corresponding division manners are determined. In this case, the terminal device or the network device may divide the first time domain resource into the R third time domain resources based on the first time domain resource, where the first time domain resource corresponds to a plurality of division manners, and the first division manner is one of the plurality of division manners. It is assumed that the quantity L of consecutive symbols of the first time domain resource is 8, and the first division manner is the division manner 3, it may be determined that the first time domain resource is divided into the three third time domain resources. It should be understood that FIG. 13 is merely an example, and should not constitute any limitation on this embodiment of this application. For example, a first time domain resource may correspond to more different division manners. This is not limited in this embodiment of this application.

The network device may send first indication information to the terminal device, where the first indication information is used to indicate a first division manner for the first time domain resource. The terminal device may determine the first division manner for the first time domain resource by using the first indication information. The first indication information may be sent to the terminal device by being carried in DCI or higher layer signaling.

In this manner, the first time domain resource is divided into the R third time domain resources. Because the network device does not need to notify the terminal device of the quantity R of repetitions, signaling overheads can be reduced.

In another specific implementation, in step S221b, that the terminal device or the network device divides the first time domain resource into the R third time domain resources includes:
  dividing the first time domain resource into the R third time domain resources based on a slot boundary in the first time domain resource.

Because the length of the first time domain resource may be greater than one slot, when the first time domain resource crosses a slot boundary, the first time domain resource may be divided into the R third time domain resources based on a slot boundary in the first time domain resource. This implementation may also be expressed as: determining, by the terminal device or the network device, the R third time domain resources based on the first time domain resource and a slot boundary.

Specifically, there may be the following several division manners.

Division manner 1: The first time domain resource is divided into the R third time domain resources based on a quantity of symbols before a slot boundary.

Figure 14:
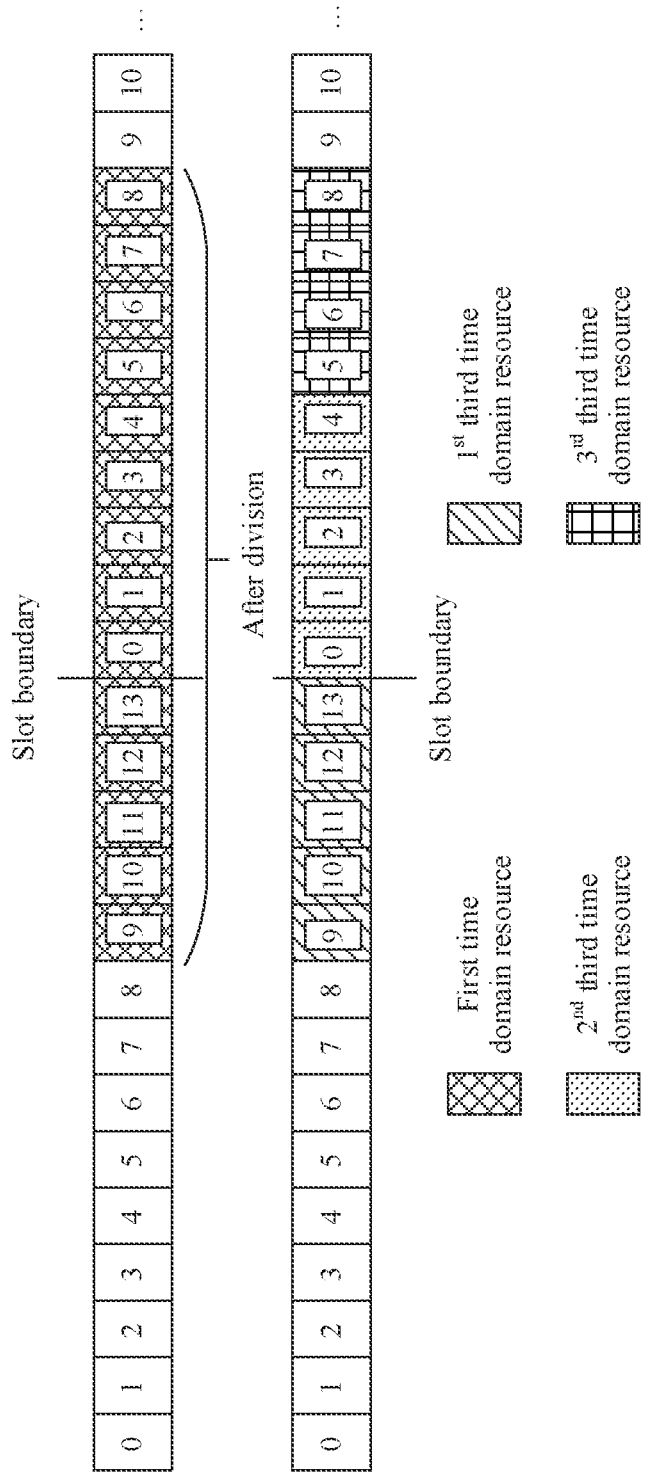
FIG. 14 is a schematic diagram of dividing a first time domain resource based on a slot boundary according to an embodiment of this application.

FIG. 14 is a schematic diagram of dividing a first time domain resource based on a slot boundary according to an embodiment of this application. A start symbol of the first time domain resource is a symbol 9, and a length of the first time domain resource is 14 symbols. The first time domain resource is the symbol 9 in the $1^{st}$ slot to a symbol 8 in the $2^{nd}$ slot. After the division is performed based on a slot boundary, five symbols remain before the slot boundary, and nine symbols remain after the slot boundary. In this case, every five symbols may be divided as one third time domain resource, and finally, the remaining four symbols form an independent third time domain resource. In this way, the first time domain resource may be divided into three third time domain resources, that is, a value of R is 3. The $1^{st}$ third time domain resource is the symbol 9 to the symbol 13 in the $1^{st}$ slot. The $2^{nd}$ third time domain resource is the symbol 0 to the symbol 4 in the $2^{nd}$ slot. The $3^{rd}$ third time domain resource is the symbol 5 to the symbol 8 in the $2^{nd}$ slot.

A more general description of this division manner is: If the first time domain resource crosses X slot boundaries, the first time domain resource may be divided into the R third time domain resources based on a quantity of symbols of the first time domain resource before the $1^{st}$ slot boundary. The quantity of symbols of the first time domain resource before the $1^{st}$ slot boundary is T. The first time domain resource crosses X slots, the quantity of symbols of the first time domain resource before the $1^{st}$ slot boundary is T, and a quantity of symbols of the last third time domain resource in the R third time domain resources is less than or equal to T.

Figure 15:
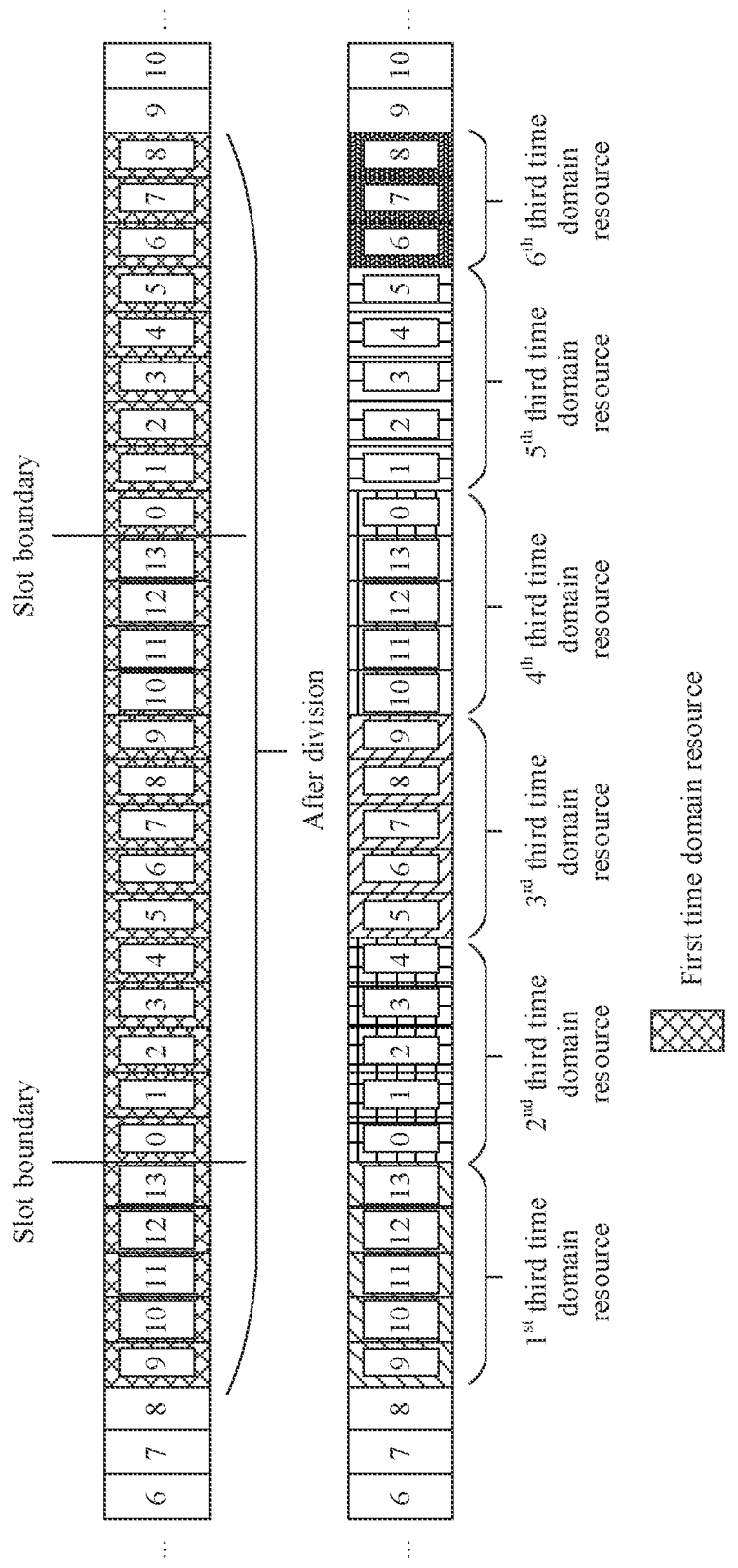
FIG. 15 is a schematic diagram of dividing a first time domain resource based on a slot boundary according to another embodiment of this application.

Descriptions are provided with reference to FIG. 15. FIG. 15 is a schematic diagram of dividing a first time domain resource based on a slot boundary according to an embodiment of this application. A start symbol of the first time domain resource is a symbol 9, and a length of the first time domain resource is 28 symbols. The first time domain resource is the symbol 9 in the $1^{st}$ slot to a symbol 8 in the $3^{rd}$ slot. T=5 symbols. After the division is performed based on a slot boundary, five symbols remain before the slot boundary, and 23 symbols remain after the slot boundary. In this case, every five symbols may be divided as one third time domain resource, and finally, the remaining three symbols form an independent third time domain resource. In this way, the first time domain resource may be divided into six third time domain resources, that is, a value of R is 6. The $1^{st}$ third time domain resource is the symbol 9 to the symbol 13 in the $1^{st}$ slot. The $2^{nd}$ third time domain resource is the symbol 0 to the symbol 4 in the $2^{nd}$ slot. The $3^{rd}$ third time domain resource is the symbol 5 to the symbol 9 in the $2^{nd}$ slot. The $4^{th}$ third time domain resource is the symbol 10 in the $2^{nd}$ slot to the symbol 0 in the $3^{rd}$ slot. The $5^{th}$ third time domain resource is the symbol 1 to the symbol 5 in the $3^{rd}$ slot. The $6^{t}$ third time domain resource is the symbol 6 to the symbol 8 in the $3^{rd}$ slot.

Optionally, for the division manner 1, if the first time domain resource crosses X slot boundaries, X+1 time domain resources (or X+1 segments of time domain resources) may be first determined based on the first time domain resource and the X slot boundaries; and then, each segment of the X+1 segments of time domain resources is divided based on a quantity of symbols of the first time domain resource before the $1^{st}$ slot boundary, and the quantity of symbols of the first time domain resource before the $1^{st}$ slot boundary is T. If one of the X+1 time domain resources has K symbols remained and K<T, the K symbols are used as one third time domain resource, or the K symbols are added to a previous third time domain resource.

Figure 16:
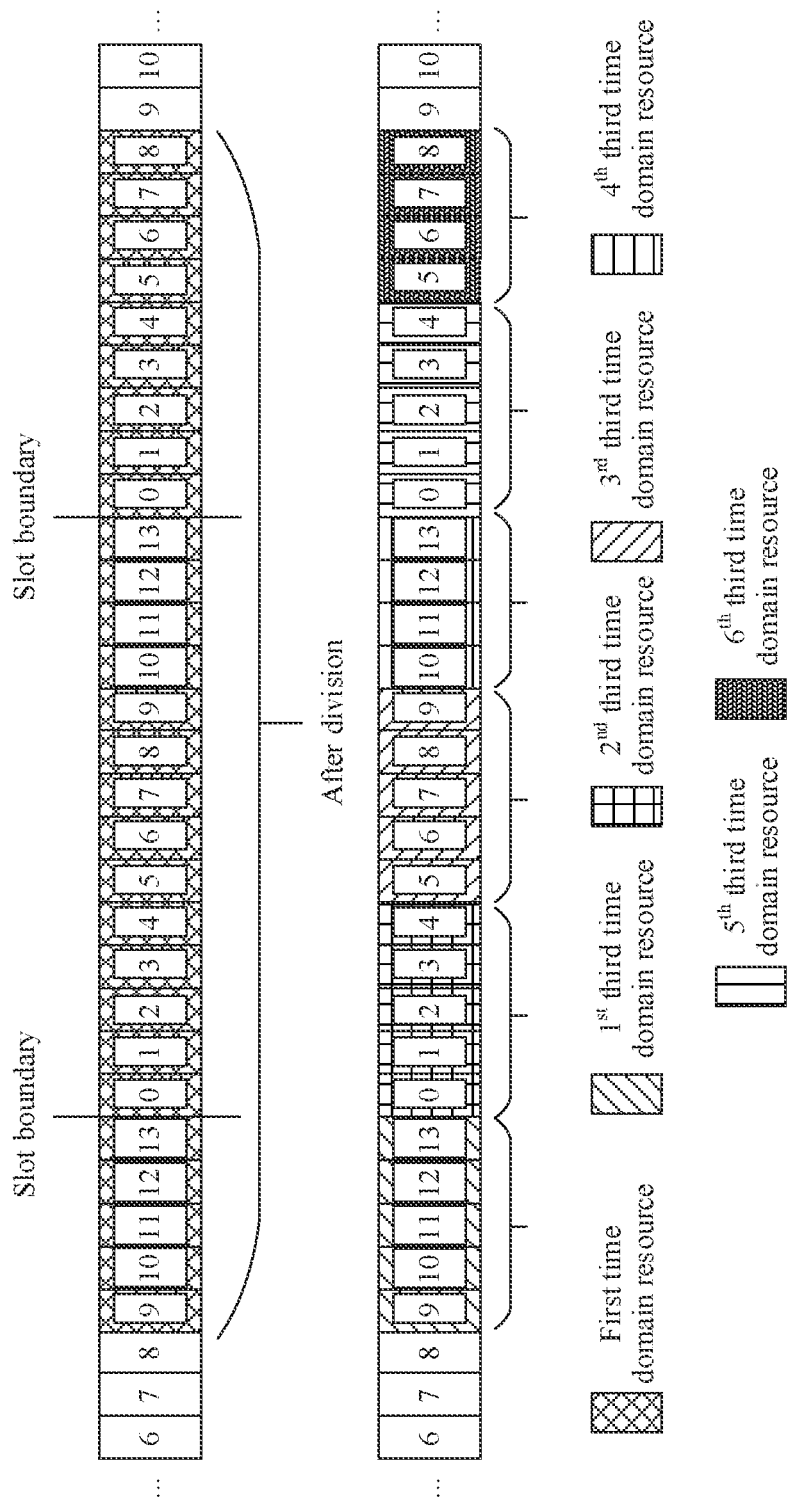
FIG. 16 is a schematic diagram of dividing a first time domain resource based on a slot boundary according to another embodiment of this application.

Descriptions are provided with reference to FIG. 16. FIG. 16 is a schematic diagram of dividing a first time domain resource based on a slot boundary according to an embodiment of this application. A start symbol of the first time domain resource is a symbol 9, and a length of the first time domain resource is 28 symbols. The first time domain resource is the symbol 9 in the $1^{st}$ slot to a symbol 8 in the $3^{rd}$ slot. T=5 symbols. After the division is performed based on a slot boundary, three time domain resources are obtained. To be specific, X=2, and the first time domain resource is divided into three segments of time domain resources. The $1^{st}$ segment of time domain resource is five symbols before the $1^{st}$ slot boundary. The $2^{nd}$ segment of time domain resource is the $2^{nd}$ slot. The $3^{rd}$ segment of time domain resource is the remaining nine symbols after the slot boundary. First, every five symbols in the $2^{nd}$ segment of time domain resource are divided as one third time domain resource, and the remaining four symbols in the $2^{nd}$ segment of time domain resource form one independent third time domain resource. Every five symbols in the $3^{rd}$ segment of time domain resource are divided as one third time domain resource, and the remaining four symbols in the $3^{rd}$ segment of time domain resource form one independent third time domain resource. In this way, the first time domain resource is divided into six third time domain resources, that is, a value of R is 6. The $1^{st}$ third time domain resource is the symbol 9 to the symbol 13 in the $1^{st}$ slot. The $2^{nd}$ third time domain resource is the symbol o to the symbol 4 in the $2^{nd}$ slot. The $3^{rd}$ third time domain resource is the symbol 5 to the symbol 9 in the $2^{nd}$ slot. The $4^{t}$ third time domain resource is the symbol 10 to the symbol 13 in the $2^{nd}$ slot. The $5^{th}$ third time domain resource is the symbol 0 to the symbol 4 in the $3^{rd}$ slot. The $6^{th}$ third time domain resource is the symbol 5 to the symbol 8 in the $3^{rd}$ slot. FIG. 16 shows that the remaining four symbols in the $2^{nd}$ segment of time domain resource are used as one independent third time domain resource. Optionally, the remaining four symbols in the $2^{nd}$ segment of time domain resource may alternatively be integrated into the $3^{rd}$ segment of third time domain resource or the $5^{t}$ third time domain resource.

Division manner 2: The first time domain resource is divided into the R third time domain resources based on a quantity of symbols after a slot boundary.

Figure 17:
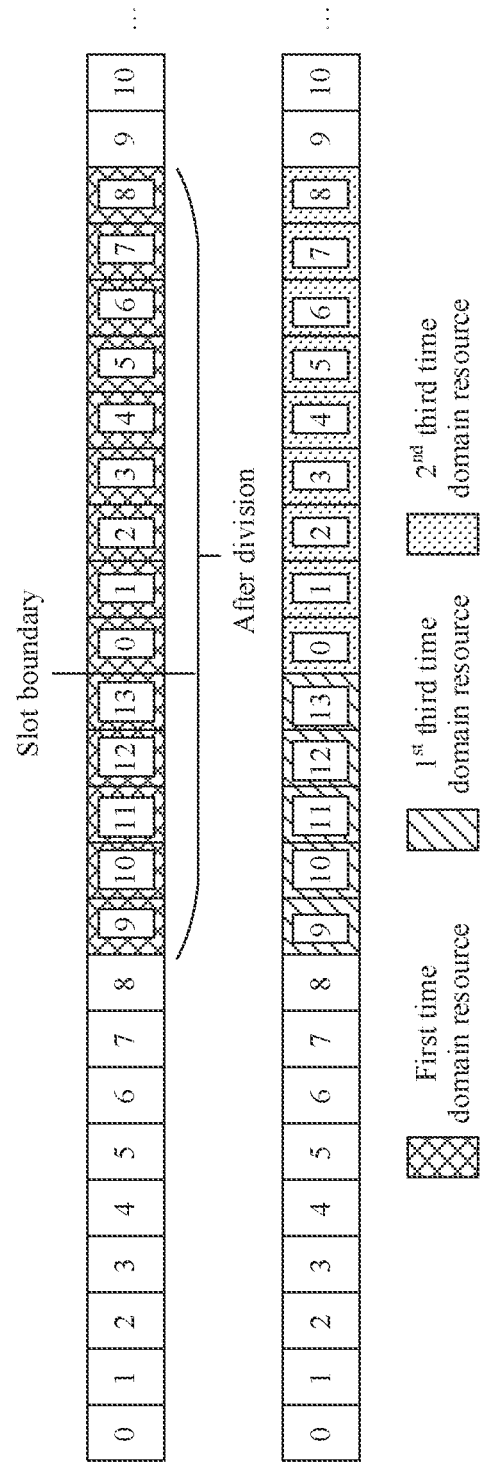
FIG. 17 is a schematic diagram of dividing a first time domain resource based on a slot boundary according to another embodiment of this application.

FIG. 17 is a schematic diagram of dividing a first time domain resource based on a slot boundary according to another embodiment of this application. A start symbol of the first time domain resource is a symbol 9, and a length of the first time domain resource is 14 symbols. The first time domain resource is the symbol 9 in the $1^{st}$ slot to a symbol 8 in the $2^{nd}$ slot. After the division is performed based on a slot boundary, five symbols remain before the slot boundary, and nine symbols remain after the slot boundary. In this case, every nine symbols may be divided as one third time domain resource. In other words, the first time domain resource is divided into two third time domain resources, that is, a value of R is 2. The $1^{st}$ third time domain resource is the symbol 9 to the symbol 13 in the $1^{st}$ slot. The $2^{nd}$ third time domain resource is the symbol 0 to the symbol 8 in the $2^{nd}$ slot.

A more general description of this division manner is: If the first time domain resource crosses X slot boundaries, the first time domain resource may be divided into the R third time domain resources based on a quantity of symbols of the first time domain resource after the last slot boundary. The quantity of symbols of the first time domain resource after the last slot boundary is Y. A quantity of symbols of the last third time domain resource in the R third time domain resources is less than or equal to Y.

Optionally, for the division manner 2, if the first time domain resource crosses X slot boundaries, the first time domain resource may be first divided into X+1 time domain resources (or X+1 segments of time domain resources) based on the X slot boundaries; and then, each segment of the X+1 segments of time domain resources is divided based on a quantity of symbols of the first time domain resource after the last slot boundary, and the quantity of symbols of the first time domain resource after the last slot boundary is Y. If one of the X+1 time domain resources has K symbols remained and K<Y, the K symbols are used as one third time domain resource, or the K symbols are added to a previous third time domain resource.

For a specific division manner, refer to the descriptions in FIG. 14 or FIG. 15 in the division manner 1. For brevity, details are not described herein again. A difference lies in that definitions of T and Y are different.

Optionally, in the process of dividing the first time domain resource into the R third time domain resources, the first time domain resource may alternatively be divided from the end to the front.

Figure 18:
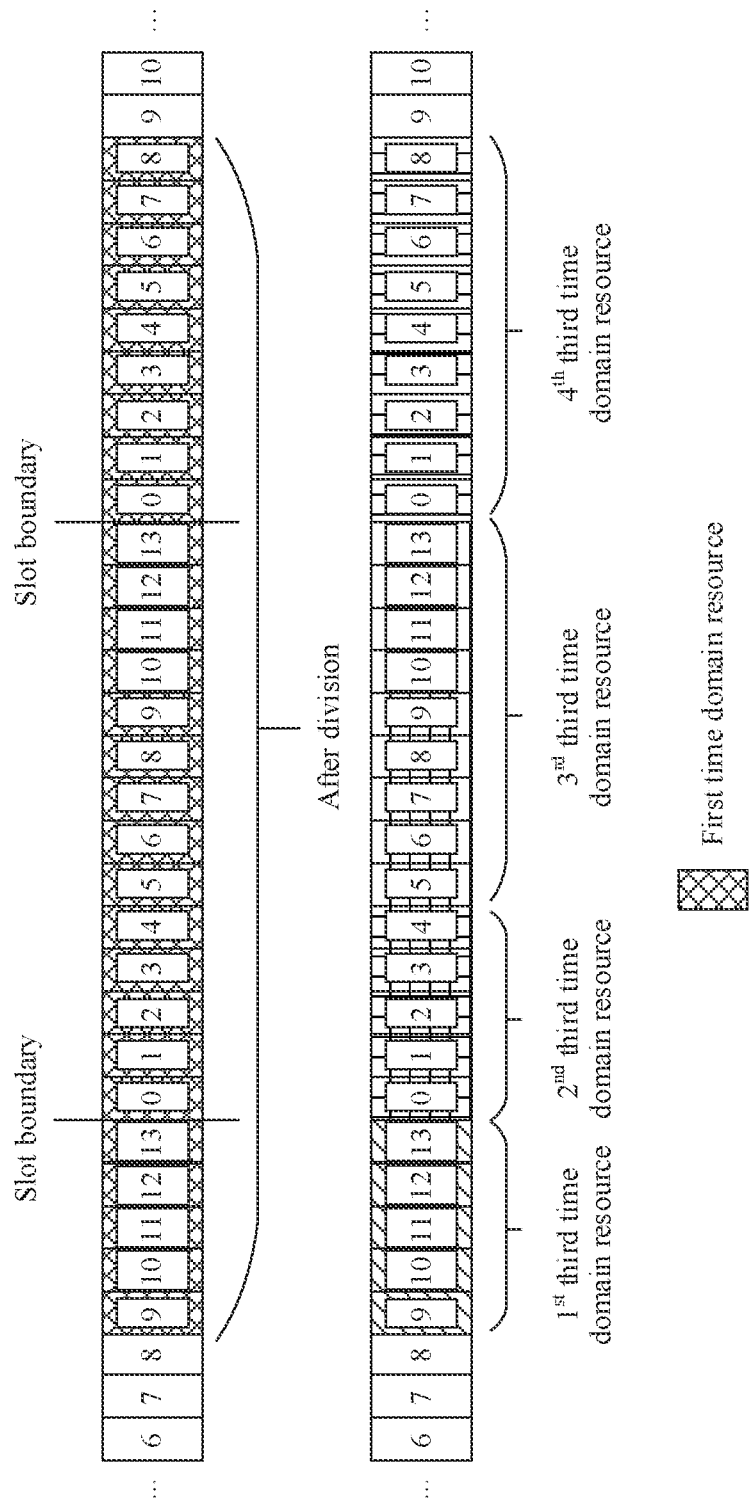
FIG. 18 is a schematic diagram of dividing a first time domain resource based on a slot boundary according to another embodiment of this application.

Descriptions are provided with reference to FIG. 18. FIG. 18 is a schematic diagram of dividing a first time domain resource based on a slot boundary according to an embodiment of this application. A start symbol of the first time domain resource is a symbol 9, and a length of the first time domain resource is 28 symbols. The first time domain resource is the symbol 9 in the $1^{st}$ slot to a symbol 8 in the $3^{rd}$ slot. A value of Y is equal to 9. After the division is performed based on a slot boundary, the first time domain resource is divided into three segments of time domain resources. The $1^{st}$ segment of time domain resource is five symbols before the $1^{st}$ slot boundary. The $2^{nd}$ segment of time domain resource is the $2^{nd}$ slot. The $3^{rd}$ segment of time domain resource is the remaining nine symbols after the slot boundary. When the first time domain resource is divided from the end to the front, every nine symbols in the $2^{nd}$ segment of time domain resource are divided as one third time domain resource first, and the first five symbols in the $2^{nd}$ segment of time domain resource form one independent third time domain resource. In this case, the first time domain resource may be divided into four third time domain resources, that is, a value of R is 4. The $1^{st}$ third time domain resource is the symbol 9 to the symbol 13 in the $1^{st}$ slot. The $2^{nd}$ third time domain resource is the symbol 0 to the symbol 4 in the $2^{nd}$ slot. The $3^{rd}$ third time domain resource is the symbol 5 to the symbol 13 in the $2^{nd}$ slot. The $4^{th}$ third time domain resource is the symbol 0 to the symbol 8 in the $3^{rd}$ slot. FIG. 18 shows that the remaining five symbols in the $2^{nd}$ segment of time domain resource are used as one independent third time domain resource. Optionally, the remaining five symbols in the $2^{nd}$ segment of time domain resource may alternatively be integrated into the $1^{st}$ third time domain resource or the $3^{rd}$ third time domain resource.

Division manner 3: The first time domain resource is divided into the R third time domain resources based on a smaller value between the quantity of symbols before the slot boundary and the quantity of symbols after the slot boundary; or the first time domain resource is divided into the R third time domain resources based on a larger value between the quantity of symbols before the slot boundary and the quantity of symbols after the slot boundary.

With reference to the example shown in FIG. 14 or FIG. 17, it can be learned that the quantity of symbols before the slot boundary is 5, and the quantity of symbols after the slot boundary is 9. In this case, the first time domain resource may be divided into the R third time domain resources based on the quantity of symbols before the slot boundary, to be specific, the first time domain resource is divided into three third time domain resources.

A more general description of this division manner is: If the first time domain resource crosses X slot boundaries, the first time domain resource may be divided into the R third time domain resources based on a smaller value between the quantity of symbols of the first time domain resource before the $1^{st}$ slot boundary and the quantity of symbols of the first time domain resource after the last slot boundary, that is, the smaller one between T and Y.

Optionally, if the first time domain resource crosses X slot boundaries, the first time domain resource may be first divided into H+1 second time domain resources by H slot boundaries; and then, W symbols are allocated for each of the H+1 second time domain resources. If K symbols remain in a time domain resource and K<W, the K symbols are used as one independent third time domain resource, or the K symbols are integrated into a previous third time domain resource or a next third time domain resource. A value of W may be predefined, may be configured by the network device, or may be a smaller one between T and Y. For a specific division manner, refer to the descriptions in the division manner 1 or the descriptions in the division manner 2. Details are not described herein again.

In another specific implementation, in step S221b, that the terminal device or the network device divides the first time domain resource into the R third time domain resources includes:

dividing the first time domain resource into the R third time domain resources based on a time domain division position in the first time domain resource, where the time domain division position is irrelevant to a start point of the first time domain resource, that is, determining the R third time domain resources based on the time domain division position in the first time domain resource and the first time domain resource.

Specifically, a fixed time domain division position in each slot may be predefined or configured. The division location is fixed, and is irrelevant to the length and the start point of the first time domain resource. That is, regardless of a position of the first time domain resource, the first time domain resource is divided based on the fixed time domain division position in the first time domain resource, to obtain the R third time domain resources.

Figure 19:
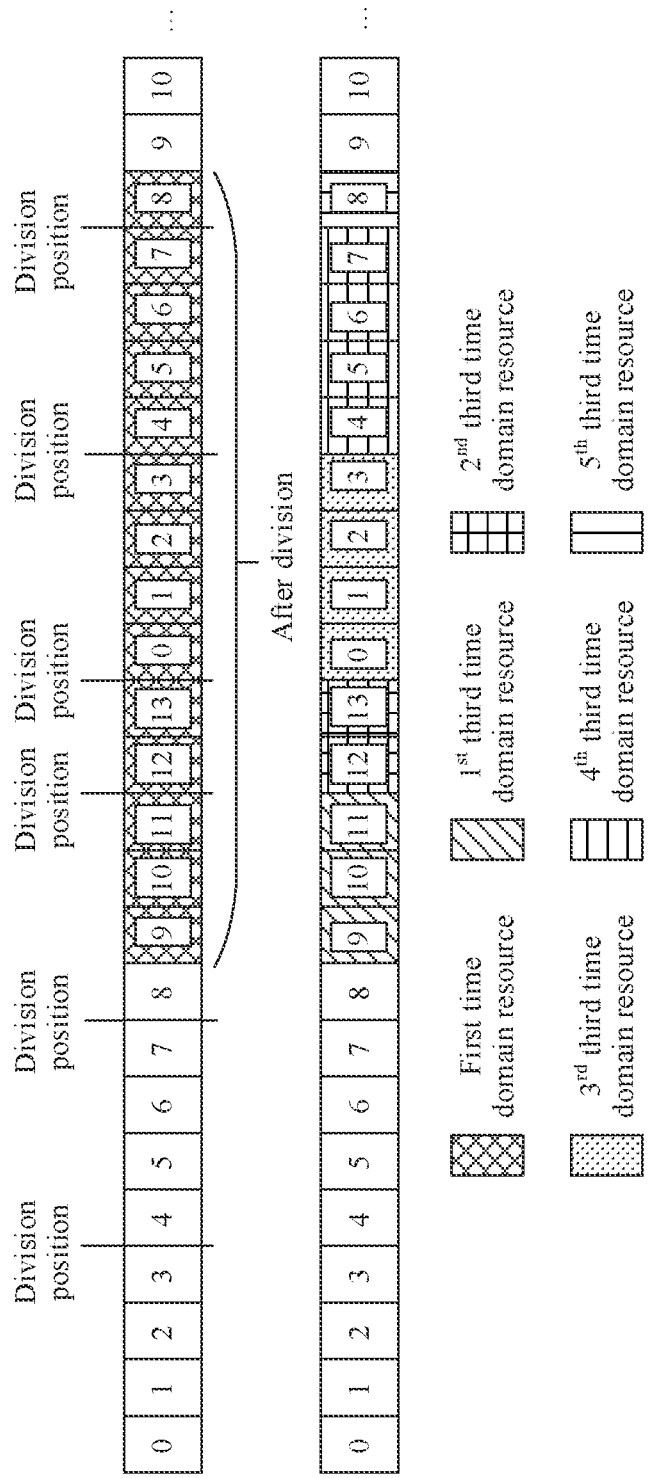
FIG. 19 is a schematic diagram of dividing a first time domain resource based on a slot boundary according to another embodiment of this application.

FIG. 19 is a schematic diagram of dividing a first time domain resource based on a time domain division position according to an embodiment of this application. A start symbol of the first time domain resource is a symbol 9, and a length of the first time domain resource is 14 symbols. The first time domain resource is the symbol 9 in the $1^{st}$ slot to a symbol 8 in the $2^{nd}$ slot. Fixed time domain division positions in each slot are: an end moment of the $3^{rd}$ symbol, an end moment of the 7th symbol, an end moment of the $11^{th}$ symbol, and an end moment of the $13^{th}$ symbol. The start symbol of the first time domain resource is the symbol 9, and the length of the first time domain resource is 14 symbols. After the first time domain resource is divided based on a fixed time domain division position, as shown in FIG. 19, the first time domain resource may be divided into five third time domain resources, that is, R is equal to 5. The $1^{st}$ third time domain resource is the symbol 9 to the symbol 11 in the $1^{st}$ slot. The $2^{nd}$ third time domain resource is the symbol 12 and the symbol 13 in the $1^{st}$ slot. The $3^{rd}$ third time domain resource is the symbol 0 to the symbol 3 in the $2^{nd}$ slot. The $4^{th}$ third time domain resource is the symbol 4 to the symbol 7 in the $2^{nd}$ slot. The $5^{th}$ third time domain resource is the symbol 8 in the $2^{nd}$ slot.

It should be understood that, in the embodiments of this application, in addition to the foregoing several division manners, the first time domain resource may further be divided into the R third time domain resources in another manner. For example, the first time domain resource is randomly divided into the R third time domain resources. This is not limited in the embodiments of this application. It should be further understood that, in the embodiments of this application, the terminal device and the network device may alternatively directly determine the M second time domain resources based on the first time domain resource. That is, the terminal device and the network device do not need to first determine the R third time domain resources based on the first time domain resource, and then, determine the M second time domain resources based on whether the R third time domain resources cross a slot boundary. Steps S221 and S222 do not need to be performed.

Specifically, the terminal device or the network device may alternatively divide the first time domain resource into the M second time domain resources based on whether the first time domain resource crosses a slot boundary. For example, when the first time domain resource does not cross a slot boundary, the first time domain resource may be evenly divided into the M second time domain resources based on a value of M, or each second time domain resource may have a different quantity of consecutive symbols. A specific division method is similar to the process of determining the R third time domain resources based on the first time domain resource in step S221. Specifically, with reference to the method for dividing the first time domain resource into the R third time domain resources in FIG. 11, the first time domain resource is divided into the M second time domain resources. Alternatively, with reference to the method for dividing the first time domain resource into the R third time domain resources in a division manner corresponding to the first time domain resource in FIG. 12, the first time domain resource is divided into the M second time domain resources in the division manner corresponding to the first time domain resource. For brevity, details are not described herein. A value of M may be notified by the network device to the terminal device by using indication information or may be predefined in a protocol. For details, refer to a manner of determining the quantity R of repetitions. Details are not described herein again.

For example, when the first time domain resource crosses a slot boundary, the first time domain resource may be divided into M second time domain resources by using the slot boundary. A specific division method may be similar to the process of dividing the first time domain resource into the R third time domain resources shown in FIG. 13 to FIG. 17. Alternatively, the first time domain resource may be divided into the M second time domain resources in a division manner that is shown in FIG. 12 and that corresponds to the first time domain resource. Alternatively, the first time domain resource may be divided into the M second time domain resources by using the time domain division positions, shown in FIG. 19, in the first time domain resource, and so on. For brevity, details are not described herein again.

Figure 20:
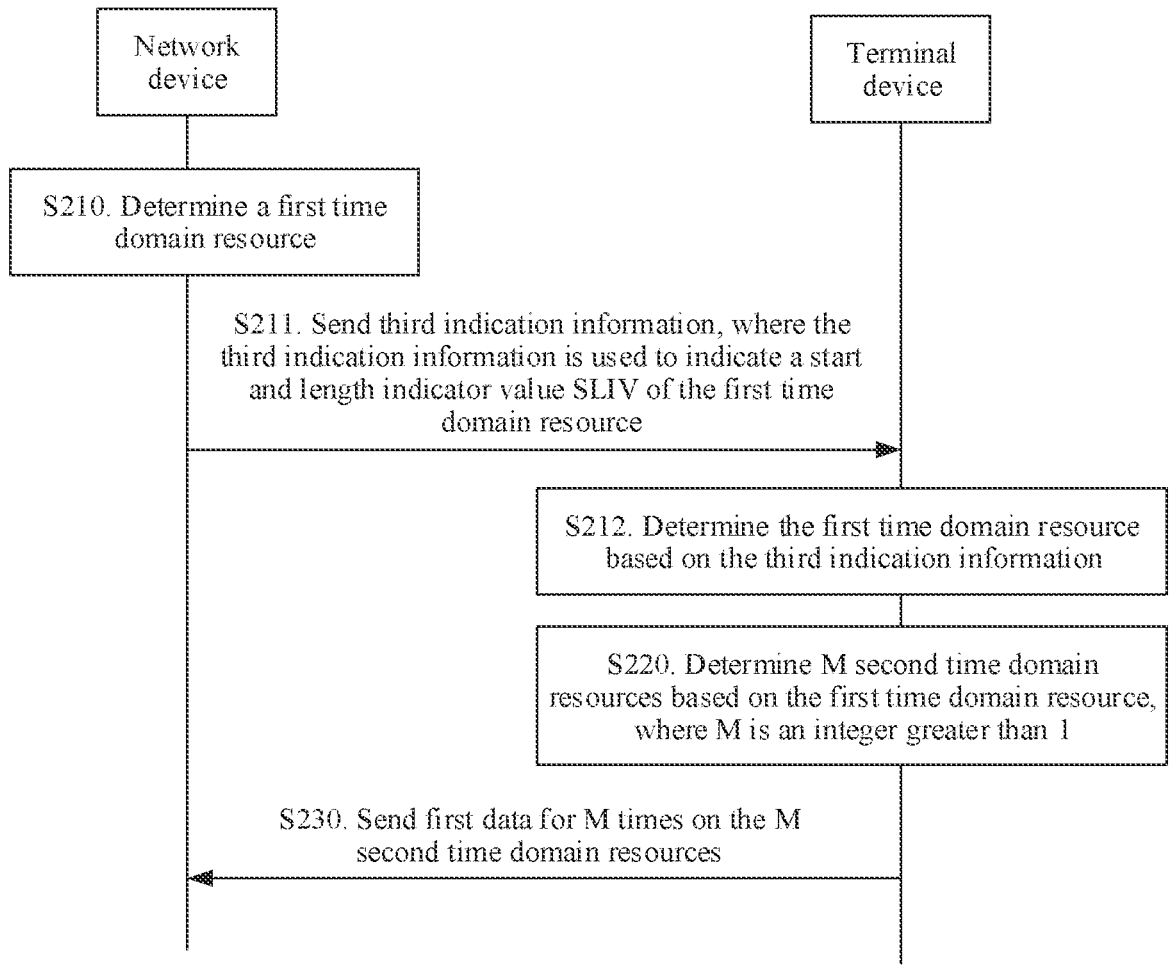
FIG. 20 is a schematic interaction diagram of another example of a data transmission method according to an embodiment of this application.

Optionally, FIG. 20 is a schematic interaction diagram of a data transmission method 200 according to another embodiment of this application. As shown in FIG. 20, the method 200 includes the following steps.

S211. A terminal device receives third indication information from a network device, where the third indication information is used to indicate a start and length indicator value SLIV of the first time domain resource, and the SLIV, a start symbol S, and a length L satisfy the following mapping relationship:

if $(L-1) \leq \lfloor N/2 \rfloor$, SLIV=$N^*(L-1)+S$;

otherwise, SLIV=$N^*(N-L+1)+(N-1-S)$, where $0 < L \leq (N-S)$; and $N > 14$.

In this application, the mapping relationship is referred to as a mapping relationship (2). S is a number of a start symbol of the first time domain resource, S is an integer greater than or equal to o, L is a quantity of consecutive symbols of the first time domain resource, and L and N are positive integers. N may be a value specified in a protocol or notified by the network device to the terminal device by using signaling. Optionally, N=M*14, and M is an integer greater than or equal to 2, for example, N=28. In this application, the signaling may be physical layer signaling or higher layer signaling. According to the foregoing mapping relationship (2), one SLIV value may uniquely determine one combination of the value of S and the value of L, and one combination of the value of S and the value of L may also uniquely determine one SLIV value.

In another specific implementation, the SLIV, S, and L meet the mapping relationship in the foregoing mapping relationship (1).

S212. The terminal device determines the first time domain resource based on the third indication information.

Specifically, when determining the first time domain resource, the terminal device may receive the third indication information sent by the network device, where the third indication information is used to indicate one row in a time domain resource table, and the time domain resource table may be predefined in a protocol or configured by higher layer signaling.

When the time domain resource table is configured by using the higher layer signaling, each row in the time domain resource table may include the following parameters: an SLIV, a parameter K2 or K0, and a PUSCH mapping type or a PDSCH mapping type, where for detailed descriptions of these parameters, refer to the foregoing descriptions, and details are not described herein again.

With reference to the foregoing mapping relationship (2), it can be learned that a time domain resource determined based on S and L may cross a slot boundary.

Because a start symbol S indicated in DCI indicates a start symbol position in a slot, value ranges of S, L, and S+L in the foregoing mapping relationship (2) may be further limited. Limitations on the value ranges of S, L, and S+L are described below by using tables.

Specific limitations are shown in Table 4 and Table 5. Table 4 is a combination table of valid downlink S and L. Table 5 is a combination table of valid uplink S and L.

TABLE 4

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, ..., N} | {3, ..., N} | {0, 1, 2, 3} (Note 1) | {3, ..., 12} | {3, ..., N} |
| Type B | {0, ..., 12} | {2, 4, 7} | {2, ..., N} | {0, ..., 10} | {2, 4, 6} | {2, ..., N} |

Note 1:
S may be equal to 3 only when a DMRS is in the $4^{th}$ symbol.

TABLE 5

| PUSCH mapping type | Normal cyclic prefix | | | Extended cyclic prefix | | |
|---|---|---|---|---|---|---|
| | S | L | S + L | S | L | S + L |
| Type A | 0 | {4, ..., N} | {4, ..., N} | 0 | {4, ..., N} | {4, ..., N} |
| Type B | {0, ..., 13} | {1, ..., N} | {1, ..., N} | {0, ..., 12} | {1, ..., N} | {1, ..., N} |

Table 5 is used as an example for description. In a case of the PUSCH mapping type being type A and the normal cyclic prefix, the start symbol S can only be equal to o, and the length L may be any value from 4 to N, but S+L cannot exceed N.

The mapping relationship satisfied by the SLIV, S, and L, and the limitations on the value ranges of S, L, and S+L may be defined in a protocol. The SLIV is determined by jointly encoding S and L based on the foregoing mapping relationship (2), and S and L need to meet the limitations in Table 4 and Table 5. The network device determines a time domain position of the first time domain resource, and specifically, may determine the position of the first time domain resource based on a scheduling algorithm or the like. This is not limited in this application. In addition, the start symbol S and L of the first time domain resource need to meet the limitations in Table 4 and Table 5. After determining S and L of the first time domain resource, the network device may jointly encode S and L based on the foregoing mapping relationship (2) to determine the SLIV, and notify the terminal device of the SLIV of the first time domain resource by using the third indication information. Therefore, after receiving the third indication information used to indicate the SLIV of the first time domain resource, the terminal device may determine the time domain position of the first time domain resource based on the mapping relationship (2). The first time domain resource may cross a slot boundary. The third indication information may be sent to the terminal device by being carried in DCI or higher layer signaling.

In another possible implementation, when the terminal device is configured to determine that the time domain resource table of the first time domain resource is a time domain resource table configured by using the higher layer signaling, each row in the time domain resource table includes a start symbol S and a length L. Values of the start symbol S and the length L need to meet specific limitations. That is, the values of the start symbol S and the length L that are of the first time domain resource and that are determined by the network device need to meet specific limitations. Restriction forms being tables are used for description. For example, the values of the start symbol S and the length L need to meet limitations in Table 6 and Table 7. Table 6 is a combination table of valid downlink S and L. Table 7 is a combination table of valid uplink S and L.

TABLE 6

| PDSCH mapping type | Normal cyclic prefix | | Extended cyclic prefix | |
|---|---|---|---|---|
| | S | L | S | L |
| Type A | {0, 1, 2, 3} (Note 1) | {3, ..., P} | {0, 1, 2, 3} (Note 1) | {3, ..., P} |
| Type B | {0, ..., 13} | {2, 4, 7} | {0, ..., 13} | {2, 4, 6} |

Note 1:
S may be equal to 3 only when a DMRS is in the 4$^{th}$ symbol.

TABLE 7

| PUSCH mapping type | Normal cyclic prefix | | Extended cyclic prefix | |
|---|---|---|---|---|
| | S | L | S | L |
| Type A | 0 | {4, ..., P} | 0 | {4, ..., P} |
| Type B | {0, ..., 13} | {1, ..., P} | {0, ..., 12} | {1, ..., P} |

A candidate value of S ranges from 0 to 13, and a candidate value of L ranges from 1 to P, where P may be specified in a protocol. For example, when the normal cyclic prefix is used, P may be 14; and when the extended cyclic prefix is used, P may be 12. With reference to Table 6 and Table 7, it can be learned that the time domain resource determined based on S and L may cross a slot boundary.

The terminal device determines S and L based on a row in the table indicated by the third indication information, and then may determine the time domain position of the first time domain resource based on S and L.

Alternatively, when determining the first time domain resource, the terminal device may receive the third indication information sent by the network device, where the third indication information directly indicates values of the start symbol S and the length L, and the values of the start symbol S and the length L need to meet the limitations of Table 6 and Table 7. The terminal device determines S and L based on the third indication information, and then may determine the time domain position of the first time domain resource based on S and L. The first time domain resource may cross a slot boundary.

In another possible implementation:
the third indication information is used to indicate one row in a time domain resource table, and
when the time domain resource table is configured by using the higher layer signaling, each row in the time domain resource table may include the following parameters:
an SLIV, a parameter K2 or K0, and a PUSCH mapping type or a PDSCH mapping type, where for detailed descriptions of these parameters, refer to the foregoing descriptions, and details are not described herein again.

With reference to the foregoing mapping relationship (2), it can be learned that a time domain resource determined based on S and L may cross a slot boundary. In addition, it is set that N=28, and limitations of value ranges of S, L, and S+L in the mapping relationship (2) still meet Table 4 and Table 5.

Alternatively, each row in the time domain resource table includes S and L, as described above.

Optionally, the third indication information is further used to indicate a start symbol S and a reference length L of the first time domain resource. The reference length is a parameter that needs to be used when the length of the first time domain resource is calculated, and is not an actual length of the first time domain resource.

In addition, the terminal device further receives fourth indication information sent by the network device, where the fourth indication information indicates a value X. X is a quantity of slot boundaries crossed by the first time domain resource. Correspondingly, the network device sends the fourth indication information, where the fourth indication information is carried in DCI or higher layer signaling.

The terminal device further receives fifth indication information sent by the network device, where the fifth indication information is used to indicate a start symbol S and a reference length L of the first time domain resource. In other words, the fifth indication information may be used to indicate one row in a time domain resource table, and the time domain resource table is configured by higher layer signaling or is predefined in a protocol.

It should be understood that the fifth indication information and the third indication information may be same indication information, or may be different indication information.

The terminal device determines S and L based on the fifth indication information, and determines, with reference to the fourth indication information, that the start symbol of the first time domain resource is S and the length of the first time domain resource is L+(X−1)*14.

Optionally, the terminal device further receives sixth indication information sent by the network device, where the sixth indication information is used to indicate a quantity W of slots crossed by the first time domain resource, and W is a nonnegative integer. Correspondingly, the network device sends the sixth indication information, where the sixth indication information is carried in DCI or higher layer signaling.

The terminal device further receives fifth indication information sent by the network device, where the fifth indication information is used to indicate a start symbol S and a reference length L of the first time domain resource. In other words, the fifth indication information may be used to indicate one row in a time domain resource table, and the time domain resource table is configured by higher layer signaling or is predefined in a protocol.

It should be understood that the sixth indication information and the third indication information may be same indication information, or may be different indication information.

The terminal device determines S and L based on the sixth indication information, and determines, with reference to the fourth indication information, a number S of the start symbol of the first time domain resource and that the length of the first time domain resource is L+W*14 symbols.

For example, the terminal device receives the fifth indication information, determines that the start symbol of the first time domain resource is S=10 and the reference length L=7, receives the fourth indication information, and determines that X=1. In this case, the start symbol S of the first time domain resource is a symbol 10 and the length of the first time domain resource is 7.

After the first time domain resource is determined, M second time domain resources may be determined with reference to the foregoing method and based on the first time domain resource, to ensure that the M second time domain resources do not cross a slot boundary, and the M second time domain resources are used to repeatedly transmit data for M times. In this way, data transmission reliability is ensured, and transmission latency is reduced.

It should be understood that, in a process of determining the first time domain resource, the terminal device or the network device may further determine the first time domain resource by using a method in an existing technology. Specifically, there may be the following several possible implementations:

In a possible implementation, the network device determines the first time domain resource by using the value ranges of S, L, and S+L in Table 1 and Table 2. After determining S and L of the first time domain resource, the network device jointly encodes S and L by using the foregoing mapping relationship (1) to determine the SLIV, and notifies the terminal device of the SLIV of the first time domain resource by using the third indication information. After receiving the third indication information used to indicate the SLIV of the first time domain resource, the terminal device may determine the time domain position of the first time domain resource based on the mapping relationship (1) and with reference to the value ranges of S, L, and S+L in Table 1 and Table 2. The first time domain resource does not cross a slot boundary. The third indication information may be sent to the terminal device by being carried in DCI or higher layer signaling.

In another possible implementation, the network device may determine the first time domain resource by using S and L in Table 1 and Table 2. When determining the first time domain resource, the terminal device may receive the third indication information sent by the network device, where the third indication information is used to indicate one row in a time domain resource table, and each row in the time domain resource table includes a start symbol S and a length L. The values of the start symbol S and the length L need to meet limitations in Table 1 and Table 2. The terminal device determines S and L based on the third indication information, and then may determine the time domain position of the first time domain resource based on S and L. The first time domain resource does not cross a slot boundary.

In another possible implementation, the network device may determine the first time domain resource by using S and L in Table 1 and Table 2. When determining the first time domain resource, the terminal device may receive indication information sent by the network device, where the indication information directly indicates values of the start symbol S and the length L, and the values of the start symbol S and the length L need to meet the limitations of Table 1 and Table 2. The terminal device determines S and L based on the indication information, and then may determine the time domain position of the first time domain resource based on S and L. The first time domain resource does not cross a slot boundary.

It should be understood that division of manners, cases, types, and embodiments in the embodiments of this application are merely for ease of description, but should not constitute any special limitation, and features in various manners, types, cases, and embodiments may be combined when there is no contradiction.

It should be further understood that numerical symbols used in the embodiments of this application are differentiated merely for ease of description, but are not used to limit the scope of the embodiments of this application. Sequence numbers of the foregoing processes do not indicate an execution sequence. The execution sequence of the processes should be determined based on functions and internal logic of the processes, and should not be construed as any limitation on the implementation processes of the embodiments of this application.

It should be further understood that the foregoing descriptions are merely intended to help a person skilled in the art better understand the embodiments of this application, but are not intended to limit the scope of the embodiments of this application. It is clear that a person skilled in the art may make various equivalent modifications or changes based on the foregoing examples. For example, some steps in the foregoing method 200 may be unnecessary, or some steps may be newly added. Alternatively, any two or more of the foregoing embodiments may be combined. Such modifications, changes, or combined solutions also fall within the scope of the embodiments of this application.

It should be further understood that the foregoing descriptions of the embodiments of this application focus on a difference between the embodiments. For same or similar parts that are not mentioned, refer to each other. For brevity, details are not described herein again.

It should be further understood that in the embodiments of this application, "predefinition" may be implemented by pre-storing corresponding code or a corresponding table in a device (for example, a terminal device or a network device) or in another manner that can be used to indicate related information. A specific implementation of "predefinition" is not limited in this application.

The foregoing describes in detail the data transmission methods in the embodiments of this application with reference to FIG. 2 to FIG. 20. The following describes in detail the communications apparatuses in the embodiments of this application with reference to FIG. 21 to FIG. 26.

Figure 21:
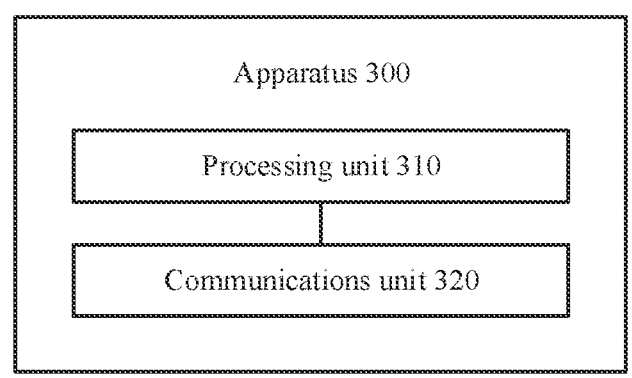
FIG. 21 is a schematic diagram of a communications apparatus according to an embodiment of this application.

FIG. 21 is a schematic block diagram of a communications apparatus 300 according to an embodiment of this application. The apparatus 300 may correspond to the terminal device described in the method 200, or may be a chip or a component applied to the terminal device. In addition, modules or units in the apparatus 300 are separately configured to perform actions or processing processes performed by the terminal device in the method 200. As shown in FIG. 21, the communications apparatus 300 may include a processing unit 310 and a communications unit 320.

The processing unit 310 is configured to determine a first time domain resource.

The processing unit 310 is further configured to determine M second time domain resources based on the first time domain resource, where M is an integer greater than 1.

The communications unit 320 is configured to: send first data to a network device for M times on the M second time domain resources; or receive, on the M second time domain resources, second data sent by a network device for M times.

It should be understood that for a specific process of performing the foregoing corresponding steps by the units in the apparatus 300, refer to the foregoing descriptions with reference to the method embodiments in FIG. 2 to FIG. 16. For brevity, details are not described herein again.

Optionally, the communications unit 320 may include a receiving unit (module) and a sending unit (module), which are configured to perform the method 200 and the steps of receiving and sending information by the terminal device in FIG. 2 to FIG. 4, FIG. 6, FIG. 10, FIG. 11, and FIG. 20. Optionally, the communications apparatus 300 may further include a storage unit 330. The storage unit 330 is configured to store an instruction executed by the communications unit 320 and the processing unit 310. The communications unit 320, the processing unit 310, and the storage unit 330 are coupled to each other. The storage unit 330 stores an instruction. The processing unit 310 is configured to execute the instruction stored in the storage unit 330. The communications unit 320 is configured to send or receive a specific signal under driving of the processing unit 310.

Figure 22:
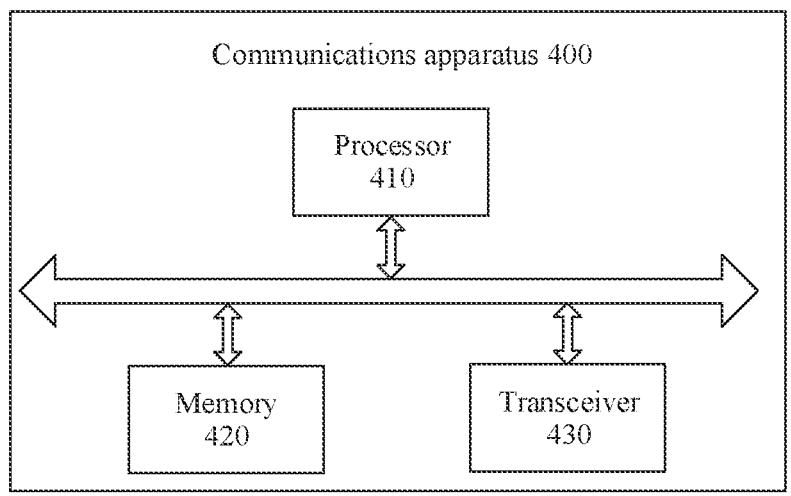
FIG. 22 is a schematic diagram of another example of a communications apparatus according to an embodiment of this application.

The processing unit 310 may be a processor. The communications unit 320 may be a transceiver, an input/output interface, or an interface circuit. The storage unit 330 may be a memory. As shown in FIG. 22, a communications apparatus 400 may include a processor 410, a memory 420, and a transceiver 430. When the communications apparatus is a chip in a communications device, the memory 420 may be a storage unit (for example, a register or a cache) in the chip, or may be a storage unit (for example, a read-only memory or a random access memory) outside the chip in the communications device.

It may be clearly understood by a person skilled in the art that, for steps performed by the communications apparatuses 300 and 400 and corresponding beneficial effects, refer to related descriptions of the terminal device in the foregoing method 200. For brevity, details are not described herein again.

Figure 23:
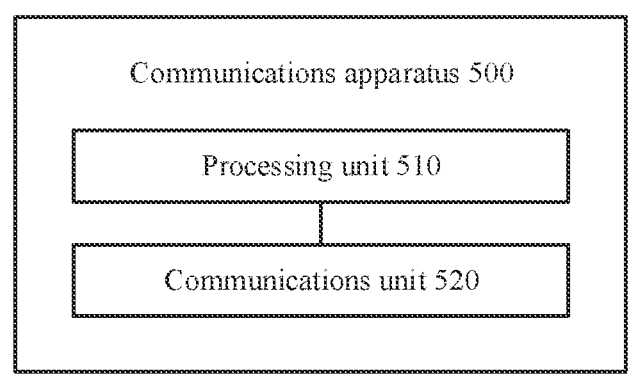
FIG. 23 is a schematic diagram of a communications apparatus according to an embodiment of this application.

FIG. 23 is a schematic block diagram of a communications apparatus 500 according to an embodiment of this application. The apparatus 500 may correspond to the network device described in the method 200, or may be a chip or a component applied to the network device. In addition, modules or units in the apparatus 500 are separately configured to perform actions or processing processes performed by the network device in the method 200. As shown in FIG. 23, the communications apparatus 500 may include a processing unit 510 and a communications unit 520.

The processing unit 510 is configured to determine a first time domain resource.

The processing unit 510 is further configured to determine M second time domain resources based on the first time domain resource, where M is an integer greater than 1.

The communications unit 520 is configured to: send second data to a terminal device for M times on the M second time domain resources; or receive, on the M second time domain resources, first data sent by a terminal device for M times.

It should be understood that for a specific process of performing the foregoing corresponding steps by the units in the apparatus 500, refer to the foregoing descriptions with reference to the method embodiments in FIG. 2 to FIG. 16. For brevity, details are not described herein again.

Optionally, the communications unit 520 may include a receiving unit (module) and a sending unit (module), which are configured to perform the method 200 and the steps of receiving and sending information by the network device in FIG. 2 to FIG. 4, FIG. 6, FIG. 10, FIG. 11, and FIG. 20. Optionally, the communications apparatus 500 may further include a storage unit 550. The storage unit 550 is configured to store an instruction executed by the communications unit 520 and the processing unit 510. The communications unit 520, the processing unit 510, and the storage unit 550 are coupled to each other. The storage unit 550 stores an instruction. The processing unit 510 is configured to execute the instruction stored in the storage unit 550. The communications unit 520 is configured to send or receive a specific signal under driving of the processing unit 510.

Figure 24:
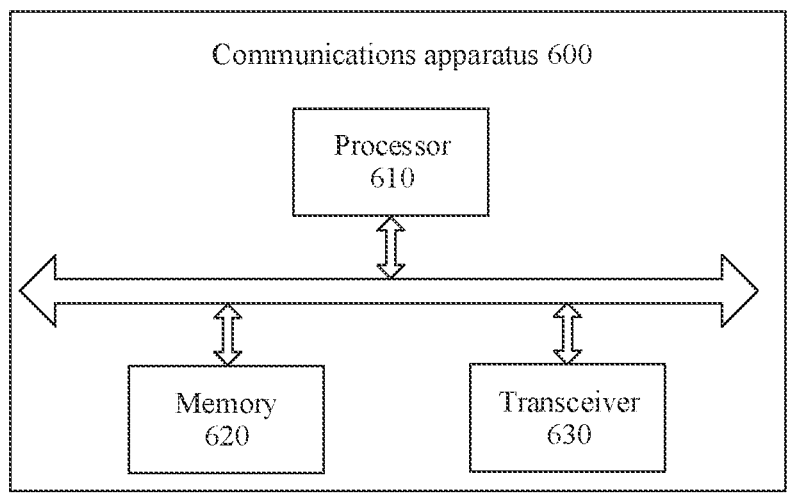
FIG. 24 is a schematic diagram of another example of a communications apparatus according to an embodiment of this application.

It should be understood that the processing unit 510 may be implemented by a processor, and the communications unit 520 may be implemented by a transceiver. The storage unit may be implemented by a memory. As shown in FIG. 24, a communications apparatus 600 may include a processor 610, a memory 620, and a transceiver 630.

It may be clearly understood by a person skilled in the art that, for steps performed by the communications apparatuses 500 and 600 and corresponding beneficial effects, refer to related descriptions of the network device in the foregoing method 200. For brevity, details are not described herein again.

It should be further understood that division into the units in the apparatuses is merely logical function division. During actual implementation, all or some of the units may be integrated into one physical entity, or may be physically separated. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In an implementation process, the steps of the foregoing methods or the foregoing units may be implemented by using a hardware integrated logic circuit of the processing element, or may be implemented in a form of software invoked by the processing element.

In an example, a unit in any one of the foregoing apparatuses may be one or more integrated circuits configured to implement the foregoing methods, for example, one or more application-specific integrated circuits (ASIC), one or more digital signal processors (DSP), one or more field programmable gate arrays (FPGA), or a combination of at least two of these integrated circuits. For another example, when the unit in the apparatus may be implemented by scheduling a program by a processing element, the processing element may be a general purpose processor, for example, a central processing unit (CPU) or another processor that can invoke the program. For still another example, the units may be integrated and implemented in a form of a system-on-a-chip (SOC).

Figure 25:
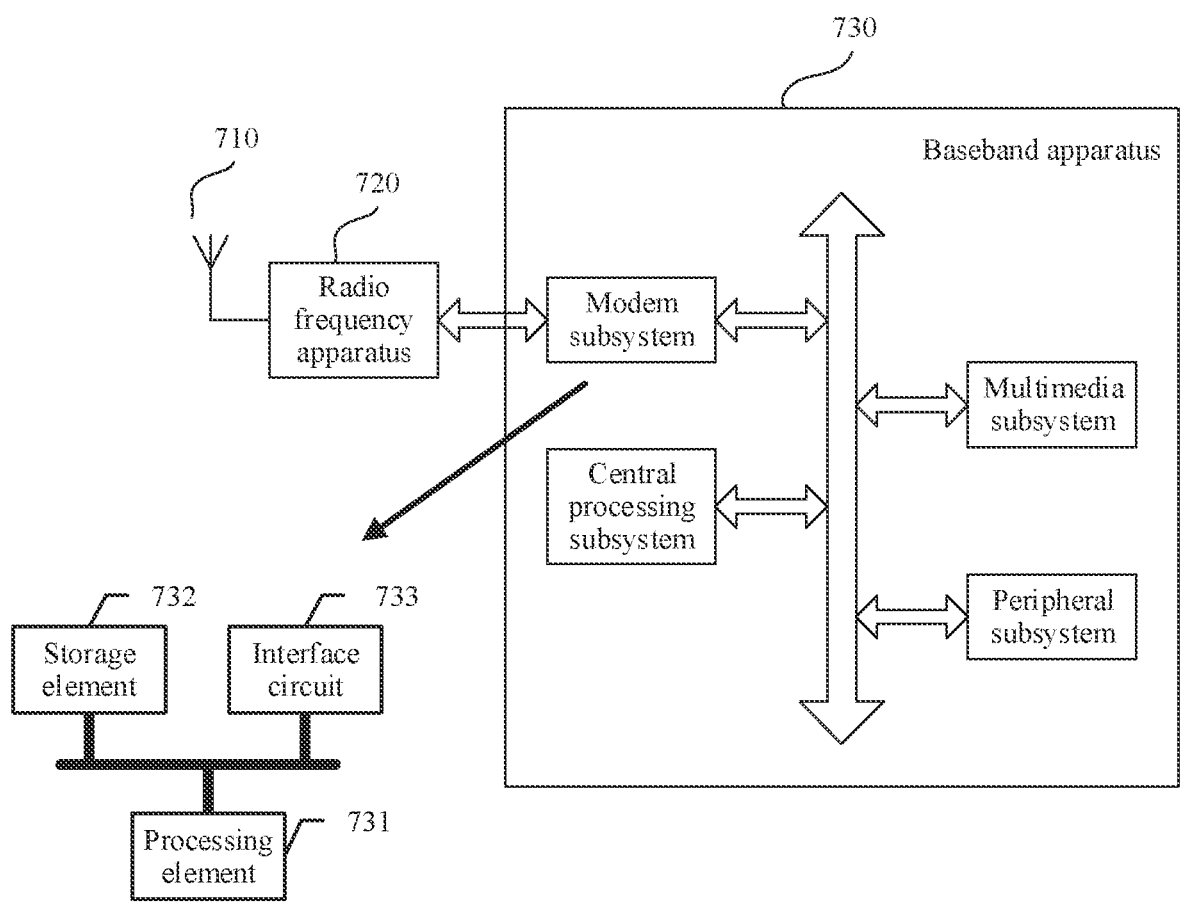
FIG. 25 is a schematic diagram of a terminal device according to an embodiment of this application.

FIG. 25 is a schematic structural diagram of a terminal device according to an embodiment of this application. The terminal device may be the terminal device in the foregoing embodiments and is configured to implement operations of the terminal device in the foregoing embodiments. As shown in FIG. 25, the terminal device includes an antenna 710, a radio frequency apparatus 720, and a baseband apparatus 730. The antenna 710 is connected to the radio frequency apparatus 720. In a downlink direction, the radio frequency apparatus 720 receives, through the antenna 710, information sent by a network device, and sends the information sent by the network device, to the baseband apparatus 730 for processing. In an uplink direction, the baseband apparatus 730 processes information of the terminal device, and sends the information to the radio frequency apparatus 720. The radio frequency apparatus 720 processes the information of the terminal device, and then sends the processed information to the network device through the antenna 710.

The baseband apparatus 730 may include a modem subsystem, configured to process data at each communications protocol layer. The baseband apparatus 730 may further include a central processing subsystem, configured to implement processing on an operating system and an application layer of the terminal. In addition, the baseband apparatus 730 may further include another subsystem, for example, a multimedia subsystem or a peripheral subsystem. The multimedia subsystem is configured to control a camera or display of a screen of the terminal device, and the peripheral subsystem is configured to implement a connection to another device. The modem subsystem may be an independent chip. Optionally, the foregoing apparatus used for the terminal may be located in the modem subsystem.

The modem subsystem may include one or more processing elements 731, for example, include one main control CPU and another integrated circuit. In addition, the modem subsystem may further include a storage element 732 and an interface circuit 733. The storage element 732 is configured to store data and a program. However, a program used to perform the methods performed by the terminal device in the foregoing methods may not be stored in the storage element 732, but is stored in a memory outside the modem subsystem. The interface circuit 733 is configured to communicate with another subsystem. The foregoing apparatus used for the terminal device may be located in the modem subsystem, and the modem subsystem may be implemented by a chip. The chip includes at least one processing element and an interface circuit. The processing element is configured to perform the steps of any one of the methods performed by the terminal device. The interface circuit is configured to communicate with another apparatus. In an implementation, units of the terminal device that implement the steps of the foregoing methods may be implemented by a processing element scheduling a program. For example, the apparatus used for the terminal device includes a processing element and a storage element. The processing element invokes a program stored in the storage element, to perform the methods performed by the terminal in the foregoing method embodiments. The storage element may be a storage element located on a same chip as the processing element, that is, an on-chip storage element.

In another implementation, the program used to perform the methods performed by the terminal device in the foregoing methods may be in a storage element located on a different chip from the processing element, that is, an off-chip storage element. In this case, the processing element invokes or loads the program from the off-chip storage element to the on-chip storage element, to invoke and perform the methods performed by the terminal in the foregoing method embodiments.

In still another implementation, units of the terminal device that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal device that implement the steps of the foregoing methods may be integrated together, and implemented in a form of a system-on-a-chip (SOC). The SOC chip is configured to implement the foregoing methods.

Figure 26:
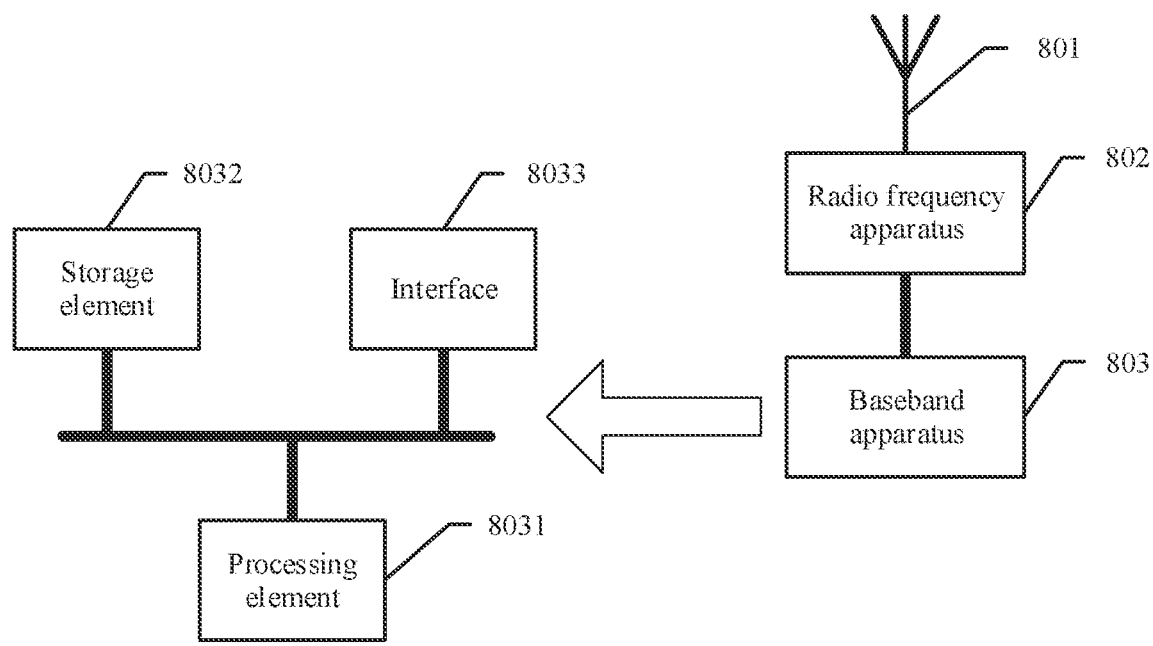
FIG. 26 is a schematic diagram of a network device according to an embodiment of this application.

FIG. 26 is a schematic structural diagram of a network device according to an embodiment of this application. The network device is configured to implement operations of the network device in the foregoing embodiments. As shown in FIG. 26, the network device includes an antenna 801, a radio frequency apparatus 802, and a baseband apparatus 803. The antenna 801 is connected to the radio frequency apparatus 802. In an uplink direction, the radio frequency apparatus 802 receives, through the antenna 801, information sent by a terminal device, and sends the information sent by the terminal device, to the baseband apparatus 803 for processing. In a downlink direction, the baseband apparatus 803 processes information of the terminal, and sends the information to the radio frequency apparatus 802. The radio frequency apparatus 802 processes the information of the terminal device, and then sends the processed information to the terminal through the antenna 801.

The baseband apparatus 803 may include one or more processing elements 8031, for example, include one main control CPU and another integrated circuit. In addition, the baseband apparatus 803 may further include a storage element 8032 and an interface 8033. The storage element 8032 is configured to store a program and data. The interface 8033 is configured to exchange information with the radio frequency apparatus 802. The interface is, for example, a common public radio interface (CPRI). The foregoing apparatus used for the network device may be located in the baseband apparatus 803. For example, the foregoing apparatus used for the network device may be a chip on the baseband apparatus 803. The chip includes at least one processing element and an interface circuit. The processing element is configured to perform the steps of any one of the methods performed by the network device. The interface circuit is configured to communicate with another apparatus. In an implementation, units of the network device that implement the steps of the foregoing methods may be implemented by a processing element scheduling a program. For example, the apparatus used for the network device includes a processing element and a storage element. The processing element invokes a program stored in the storage element, to perform the methods performed by the network device in the foregoing method embodiments. The storage element may be a storage element located on a same chip as the processing element, that is, an on-chip storage element, or may be a storage element located on a different chip from the processing element, that is, an off-chip storage element.

In another implementation, units of the network device that implement the steps in the foregoing methods may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps of the foregoing methods may be integrated together, and implemented in a form of a system-on-a-chip. For example, the baseband apparatus includes the SOC chip, configured to implement the foregoing methods.

The terminal device and the network device in the foregoing apparatus embodiments may completely correspond to the terminal device or the network device in the method embodiments, and a corresponding module or unit performs a corresponding step. For example, when the apparatus is implemented by a chip, the receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

An embodiment of this application further provides a communications system. The communications system includes the foregoing terminal device and the foregoing network device.

An embodiment of this application further provides a computer-readable medium, configured to store computer program. The computer program includes an instruction used to perform the data transmission method in the embodiments of this application in the method 200. The readable medium may be a read-only memory (ROM) or a random access memory (RAM). This is not limited in this embodiment of this application.

This application further provides a computer program product. The computer program product includes an instruction. When the instruction is executed, a terminal device and a network device perform operations corresponding to the terminal device and the network device in the foregoing methods.

An embodiment of this application further provides a system chip. The system chip includes a processing unit and a communications unit. The processing unit may be, for example, a processor. The communications unit may be, for example, an input/output interface, a pin, or a circuit. The processing unit may execute a computer instruction, so that a chip in the communications apparatus performs any data transmission method provided in the foregoing embodiments of this application.

Optionally, the computer instruction is stored in a storage unit.

Optionally, the storage unit is a storage unit in the chip, for example, a register or a cache, or the storage unit may be a storage unit in a terminal but outside the chip, for example, a read-only memory (ROM) or another type of static storage device capable of storing static information and instructions, or a random access memory (RAM). The processor mentioned in any one of the foregoing designs may be a CPU, a microprocessor, an ASIC, or one or more integrated circuits used to control program execution of the data transmission method. The processing unit and the storage unit may be decoupled, are separately disposed on different physical devices, and are connected in a wired or wireless manner to implement respective functions of the processing unit and the storage unit, to support the system chip in implementing various functions in the foregoing embodiments. Alternatively, the processing unit and the memory may be coupled to a same device.

It may be understood that the memory in the embodiments of this application may be a volatile memory or a non-volatile memory, or may include both a volatile memory and a non-volatile memory. The non-volatile memory may be a ROM, a programmable read-only memory (PROM), an erasable programmable read-only memory (EPROM), an electrically erasable programmable read-only memory (EEPROM), or a flash memory. The volatile memory may be a RAM and is used as an external cache. Many types of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

The terms "uplink" and "downlink" in this application are used to describe data/information transmission directions in a specific scenario. For example, an "uplink" direction is usually a direction in which data/information is transmitted from a terminal to a network side, or a direction in which data/information is transmitted from a distributed unit to a central unit, and a "downlink" direction is usually a direction in which data/information is transmitted from a network side to a terminal, or a direction in which data/information is transmitted from a central unit to a distributed unit. It may be understood that the "uplink" and the "downlink" are only used to describe transmission directions of data/information, and neither a specific device from which data/information transmission starts nor a specific device at which data/information transmission stops is limited.

Names may be assigned to various objects that may appear in this application, such as various messages/information/devices/network/elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

All or some of the methods in the embodiments of this application may be implemented by software, hardware, firmware, or any combination thereof. When software is used for implementation, all or some of the embodiments may be implemented in a form of computer program product. The computer program product includes one or more computer programs or instructions. When the computer program or instruction is loaded and executed on a computer, the procedures or functions in the embodiments of this application are all or partially performed. The computer may be a general-purpose computer, a special-purpose computer, a computer network, or another programmable apparatus. The computer program or instruction may be stored in a computer-readable storage medium, or may be transmitted by using the computer-readable storage medium. The computer-readable storage medium may be any usable medium accessible by a computer, or a data storage device, such as a server integrating one or more usable media.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the division of units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    determining a first time domain resource allocated for repetitive transmissions;
    obtaining R third time domain resources by repeating the first time domain resource for R times based on an interval between adjacent third time domain resources of the R third time domain resources, wherein R is an integer greater than 1;
    determining H+1 second time domain resources based on a fourth time domain resource, wherein the fourth time domain resource is any third time domain resource that spans a slot boundary in the R third time domain resources, the fourth time domain resource spans H slot boundaries, and H is a positive integer;
    determining M second time domain resources, wherein M is an integer greater than R, and the M second time domain resources comprise Q second time domain resources and M-Q second time domain resources, and the Q second time domain resources are Q third time domain resources that do not cross a slot boundary in the R third time domain resources, and the M-Q second time domain resources are second time domain resources determined based on the fourth time domain resource, and Q is a positive integer less than R; and
    sending first data to a network device for M times on the M second time domain resources, respectively.

2. The method according to claim 1, wherein determining the first time domain resource comprises:
    receiving indication information from the network device, wherein the indication information indicates one row in a time domain resource table configured by higher layer signaling, each row in the time domain resource table comprises a start symbol S and a length L, a value of S ranges from 0 to 13, and a value of L ranges from 1 to 14; and
    determining the first time domain resource based on the indication information.

3. The method according to claim 2, wherein the first time domain resource crosses at least one slot boundary.

4. The method according to claim 1, wherein the first data is carried on a physical uplink shared channel (PUSCH), and a mapping type of the PUSCH is type B indicating that a $1^{st}$ time domain symbol of a demodulation reference signal (DMRS) of the PUSCH is a $1^{st}$ time domain symbol of the PUSCH.

5. An apparatus comprising:
    one or more processors; and
    a non-transitory computer readable medium storing a program to be executed by the one or more processors, the program comprises instructions for:
        determining a first time domain resource allocated for repetitive transmissions;
        obtaining R third time domain resources by repeating the first time domain resource for R times based on an interval between adjacent third time domain resources of the R third time domain resources, wherein R is an integer greater than 1;
        determining H+1 second time domain resources based on a fourth time domain resource, wherein the fourth time domain resource is any third time domain resource that spans a slot boundary in the R third time domain resources, the fourth time domain resource spans H slot boundaries, and H is a positive integer;
        determining M second time domain resources, wherein M is an integer greater than R, and the M second time domain resources comprise Q second time domain resources and M-Q second time domain resources, and the Q second time domain resources are Q third time domain resources that do not cross a slot boundary in the R third time domain resources, and the M-Q second time domain resources are second time domain resources determined based on the fourth time domain resource, and Q is a positive integer less than R; and
        sending first data to a network device for M times on the M second time domain resources, respectively.

6. The apparatus according to claim 5, wherein the program further comprises instructions for:
- receiving indication information from the network device, wherein the indication information indicates one row in a time domain resource table configured by higher layer signaling, each row in the time domain resource table comprises a start symbol S and a length L, a value of S ranges from 0 to 13, and a value of L ranges from 1 to 14; and
- determining the first time domain resource based on the indication information.

7. The apparatus according to claim 6, wherein the first time domain resource crosses at least one slot boundary.

8. The apparatus according to claim 6, wherein the first data is carried on a physical uplink shared channel (PUSCH), and a mapping type of the PUSCH is type B indicating that a $1^{st}$ time domain symbol of a demodulation reference signal (DMRS) of the PUSCH is a $1^{st}$ time domain symbol of the PUSCH.

9. An apparatus comprising:
- one or more processors; and
- a non-transitory computer readable medium storing a program to be executed by the one or more processors, the program comprises instructions for:
  - determining a first time domain resource allocated for repetitive transmissions;
  - obtaining R third time domain resources by repeating the first time domain resource for R times based on an interval between adjacent third time domain resources of the R third time domain resources, wherein R is an integer greater than 1;
  - determining H+1 second time domain resources based on a fourth time domain resource, wherein the fourth time domain resource is any third time domain resource that spans a slot boundary in the R third time domain resources, the fourth time domain resource spans H slot boundaries, and H is a positive integer;
  - determining M second time domain resources, wherein M is an integer greater than R, and the M second time domain resources comprise Q second time domain resources and M-Q second time domain resources, and the Q second time domain resources are Q third time domain resources that do not cross a slot boundary in the R third time domain resources, and the M-Q second time domain resources are second time domain resources determined based on the fourth time domain resource, and Q is a positive integer less than R; and
  - receiving first data from a terminal device for M times on the M second time domain resources, respectively.

10. The apparatus according to claim 9, wherein the program further comprises instructions for:
- sending indication information to the terminal device, wherein the indication information indicates one row in a time domain resource table configured by higher layer signaling, each row in the time domain resource table comprises a start symbol S and a length L, a value of S ranges from 0 to 13, and a value of L ranges from 1 to 14; and
- determining the first time domain resource based on the indication information.

11. The apparatus according to claim 10, wherein the first time domain resource crosses at least one slot boundary.

12. The apparatus according to claim 9, wherein the first data is carried on a physical uplink shared channel (PUSCH), and a mapping type of the PUSCH is type B indicating that a $1^{st}$ time domain symbol of demodulation reference signal (DMRS) of the PUSCH is a $1^{st}$ time domain symbol of the PUSCH.

13. The method according to claim 1, wherein the method is performed by a terminal device, and the network device is a base station.

14. The method according to claim 1, wherein a length of each of the M second time domain resources is less than a length of a slot.

15. The method according to claim 1, wherein the first data corresponds to an Ultra-Reliable Low Latency Communications (URLLC) service.

16. The apparatus according to claim 5, wherein the apparatus is a terminal device or is comprised in a terminal device, and the network device is a base station.

17. The apparatus according to claim 5, wherein a length of each of the M second time domain resources is less than a length of a slot.

18. The apparatus according to claim 5, wherein the first data corresponds to an Ultra-Reliable Low Latency Communications (URLLC) service.

19. The apparatus according to claim 9, wherein the apparatus is a base station or is applied to a base station.

20. The apparatus according to claim 9, wherein a length of each of the M second time domain resources is less than a length of a slot.

* * * * *

UNITED STATES PATENT AND TRADEMARK OFFICE
CERTIFICATE OF CORRECTION

PATENT NO. : 12,016,044 B2
APPLICATION NO. : 17/313903
DATED : June 18, 2024
INVENTOR(S) : Ma et al.

It is certified that error appears in the above-identified patent and that said Letters Patent is hereby corrected as shown below:

In the Specification

In Column 3, Line 57, delete "o," and insert -- 0, --.

In Column 5, Lines 17-18, delete "(N–1–S) where 0<L(N–S)." and insert -- (N–1–S), where $0<L\leq(N-S)$; --.

In Column 5, Line 22, delete "o," and insert -- 0, --.

In Column 5, Line 33, delete "o," and insert -- 0, --.

In Column 7, Line 55, delete "O," and insert -- 0, --.

In Column 9, Line 10, delete "S." and insert -- S; --.

In Column 9, Lines 12-13, delete "(N–1–S) where 0<L(N–S)." and insert -- (N–1–S), where $0<L\leq(N-S)$; --.

In Column 9, Line 18, delete "o," and insert -- 0, --.

In Column 9, Line 28, delete "o," and insert -- 0, --.

In Column 16, Line 12, delete "S." and insert -- S; --.

In Column 16, Line 15, delete "$O\leq L\leq(14-S)$" and insert -- $0<L\leq(14-S)$. --.

In Column 16, Line 60, delete "o," and insert -- 0, --.

In Column 19, Line 65, delete "o." and insert -- 0. --.

Signed and Sealed this
Thirtieth Day of July, 2024

Katherine Kelly Vidal
*Director of the United States Patent and Trademark Office*

In Column 21, Line 13, delete "o." and insert -- 0. --.

In Column 22, Line 6, delete "4th" and insert -- $4^{th}$ --.

In Column 22, Line 55, delete "3rd" and insert -- $3^{rd}$ --.

In Column 28, Line 37, delete "o." and insert -- 0. --.

In Column 29, Line 5, delete "o." and insert -- 0. --.

In Column 29, Line 62, delete "$\lfloor L/R \rfloor$," and insert -- $\lfloor L/R \rfloor$ --.

In Column 31, Line 6, delete "1st" and insert -- $1^{st}$ --.

In Column 33, Line 16, delete "6ᵗʰ" and insert -- $6^{th}$ --.

In Column 33, Line 58, delete "o to" and insert -- 0 to --.

In Column 33, Line 60, delete "4ᵗʰ" and insert -- $4^{th}$ --.

In Column 34, Line 3, delete "5ᵗʰ" and insert -- $5^{th}$ --.

In Column 36, Line 17, delete "7th" and insert -- $7^{th}$ --.

In Column 37, Line 63, delete "o," and insert -- 0, --.

In Column 38, Line 65, delete "o," and insert -- 0, --.

In the Claims

In Column 51, in Claim 8, Line 15, delete "claim 6," and insert -- claim 5, --.